US012561331B1

(12) United States Patent
Chen et al.

(10) Patent No.: US 12,561,331 B1
(45) Date of Patent: Feb. 24, 2026

(54) TOP-K INFORMATION PUSH DOWN IN QUERY PLAN INCLUDING INNER JOIN

(71) Applicant: Snowflake Inc., Bozeman, MT (US)

(72) Inventors: Bowei Chen, San Bruno, CA (US); Corbin McElhanney, San Mateo, CA (US); Eric Alan Musser, Redwood City, CA (US)

(73) Assignee: Snowflake Inc., Bozeman, MT (US)

( * ) Notice: Subject to any disclaimer, the term of this patent is extended or adjusted under 35 U.S.C. 154(b) by 0 days.

(21) Appl. No.: 19/039,998

(22) Filed: Jan. 29, 2025

(51) Int. Cl.
*G06F 16/2455* (2019.01)
*G06F 16/22* (2019.01)
*G06F 16/2453* (2019.01)

(52) U.S. Cl.
CPC .... *G06F 16/24556* (2019.01); *G06F 16/2255* (2019.01); *G06F 16/24544* (2019.01)

(58) Field of Classification Search
None
See application file for complete search history.

(56) References Cited

U.S. PATENT DOCUMENTS

| | | | | |
|---|---|---|---|---|
| 7,133,858 B1 * | 11/2006 | Larson | .............. | G06F 16/24556 |
| 8,296,306 B1 * | 10/2012 | Whang | ..................... | G06F 7/22 |
| | | | | 707/752 |
| 8,856,103 B2 * | 10/2014 | Barber | .............. | G06F 16/24542 |
| | | | | 707/718 |
| 10,997,173 B2 | 5/2021 | Chen et al. | | |
| 11,880,369 B1 | 1/2024 | Heimel et al. | | |
| 2011/0055199 A1 * | 3/2011 | Siddiqui | .............. | G06F 16/2456 |
| | | | | 707/E17.017 |

OTHER PUBLICATIONS

Mamoulis, Nikos, "Efficient top-k aggregation of ranked inputs", ACM Transactions on Database Systems TODS vol. 32 Issue 3, (Aug. 2007), 45 pages.

* cited by examiner

*Primary Examiner* — Amresh Singh
(74) *Attorney, Agent, or Firm* — Schwegman Lundberg & Woessner, P.A.

(57) ABSTRACT

Various example embodiments described herein provide for systems, methods, devices, instructions, and the like for optimizing a query plan to execute a query by using early row flush and pushing down top-k information in a query plan that includes an inner join, which can be used within a data platform environment. In particular, various example embodiments use early flush operations by one or more aggregation operators to eventually enable information from a top-k operator of a query plan to be pushed down the query plan and through one or more inner join operators of the query plan to one or more select operators (e.g., aggregation operators and table scan operators) positioned below the one or more inner join operators.

20 Claims, 11 Drawing Sheets

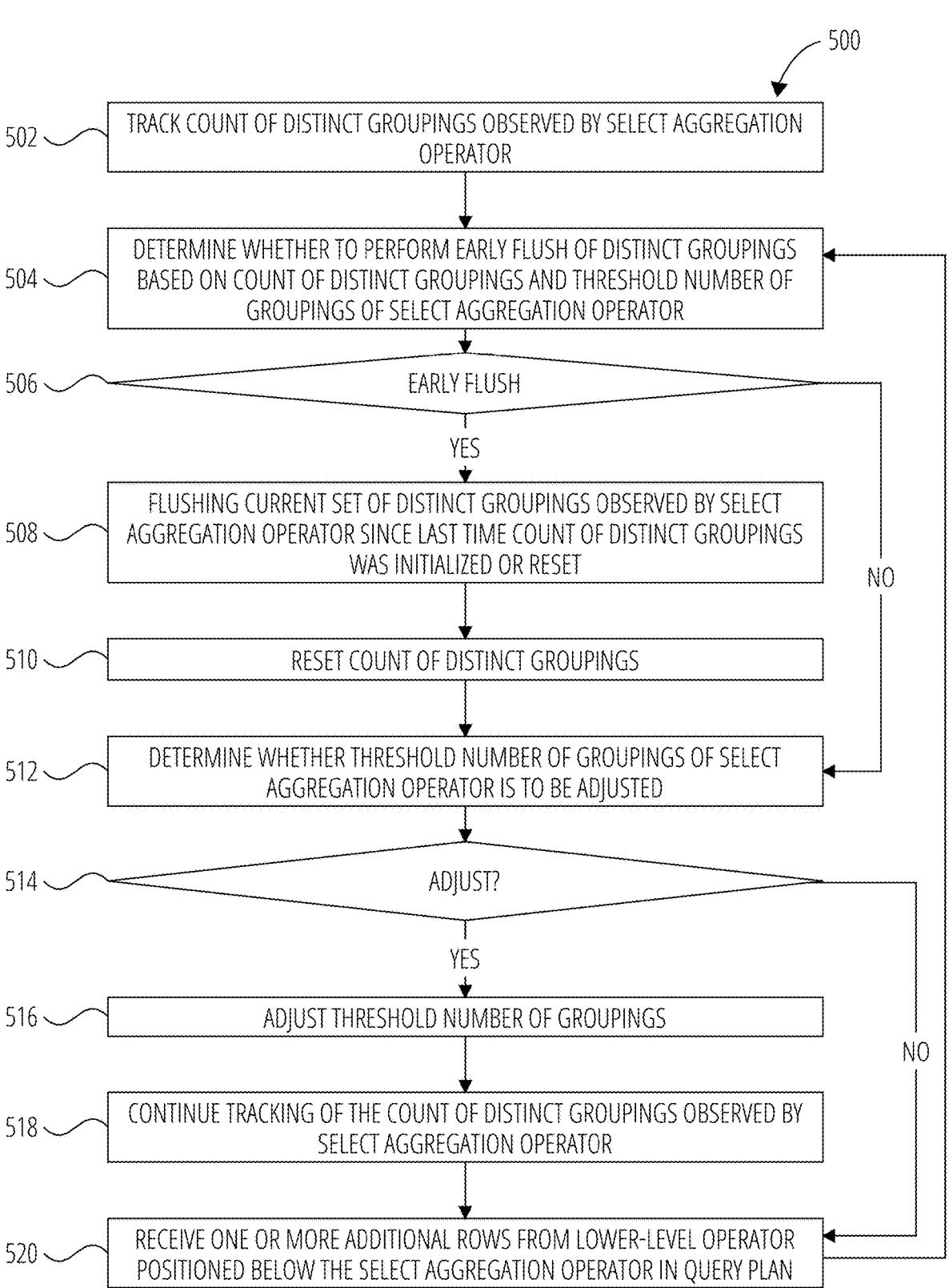

500

502 — TRACK COUNT OF DISTINCT GROUPINGS OBSERVED BY SELECT AGGREGATION OPERATOR

504 — DETERMINE WHETHER TO PERFORM EARLY FLUSH OF DISTINCT GROUPINGS BASED ON COUNT OF DISTINCT GROUPINGS AND THRESHOLD NUMBER OF GROUPINGS OF SELECT AGGREGATION OPERATOR

506 — EARLY FLUSH

YES

NO

508 — FLUSHING CURRENT SET OF DISTINCT GROUPINGS OBSERVED BY SELECT AGGREGATION OPERATOR SINCE LAST TIME COUNT OF DISTINCT GROUPINGS WAS INITIALIZED OR RESET

510 — RESET COUNT OF DISTINCT GROUPINGS

512 — DETERMINE WHETHER THRESHOLD NUMBER OF GROUPINGS OF SELECT AGGREGATION OPERATOR IS TO BE ADJUSTED

514 — ADJUST?

YES

NO

516 — ADJUST THRESHOLD NUMBER OF GROUPINGS

518 — CONTINUE TRACKING OF THE COUNT OF DISTINCT GROUPINGS OBSERVED BY SELECT AGGREGATION OPERATOR

520 — RECEIVE ONE OR MORE ADDITIONAL ROWS FROM LOWER-LEVEL OPERATOR POSITIONED BELOW THE SELECT AGGREGATION OPERATOR IN QUERY PLAN

FIG. 5

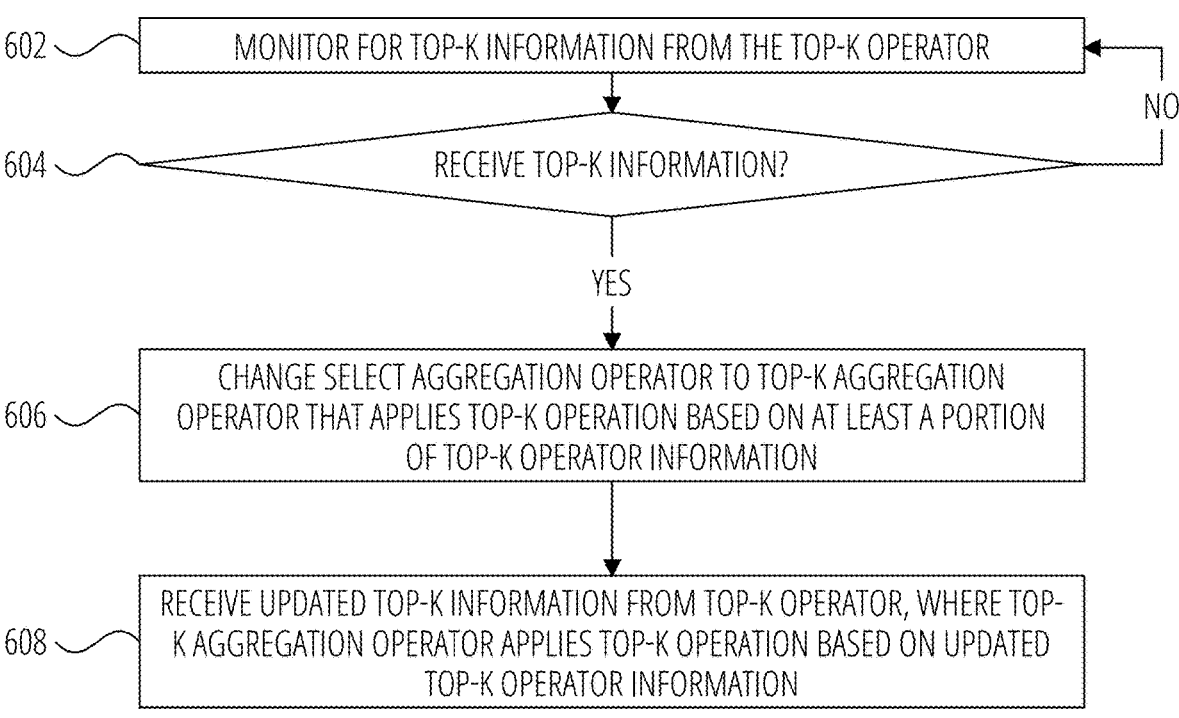

602 — MONITOR FOR TOP-K INFORMATION FROM THE TOP-K OPERATOR

604 — RECEIVE TOP-K INFORMATION?

NO

YES

606 — CHANGE SELECT AGGREGATION OPERATOR TO TOP-K AGGREGATION OPERATOR THAT APPLIES TOP-K OPERATION BASED ON AT LEAST A PORTION OF TOP-K OPERATOR INFORMATION

608 — RECEIVE UPDATED TOP-K INFORMATION FROM TOP-K OPERATOR, WHERE TOP-K AGGREGATION OPERATOR APPLIES TOP-K OPERATION BASED ON UPDATED TOP-K OPERATOR INFORMATION

FIG. 6

TOP-K INFORMATION PUSH DOWN IN QUERY PLAN INCLUDING INNER JOIN

TECHNICAL FIELD

Embodiments described herein relate to data platforms and, more particularly, to systems, methods, devices, and instructions for optimizing a query plan for executing a query by using early row flush and pushing down top-k information in a query plan that includes an inner join, which can be used within a data platform (e.g., database) environment.

BACKGROUND

Database query optimization remains a critical challenge in modern data processing systems. In particular, queries that combine aggregation operations with joins present significant performance challenges. For example, top-k aggregation queries, which return a limited number of results ordered by specific criteria, are especially common in analytical workloads. A top-k aggregation query can comprise a query statement that includes a first clause to sort results of a query (also referred to herein as a "result set") in ascending or descending order (e.g., an ORDER BY clause in structured query language (SQL)), a second clause that limits the result set to a specific number of results (e.g., a LIMIT or LIMIT OFFSET clause in SQL), and a third clause that indicates a grouping set (e.g., GROUP-BY clause in SQL), which can be used with or without an aggregation function.

BRIEF DESCRIPTION THE DRAWINGS

Various ones of the appended drawings merely illustrate various example embodiments of the present disclosure and should not be considered as limiting its scope. In the drawings, which are not necessarily drawn to scale, like numerals may describe similar components in different views. To easily identify the discussion of any particular element or act, the most significant digit or digits in a reference number refer to the figure number in which that element is first introduced.

FIG. 4 through FIG. 6 are flowcharts of example methods for optimizing a query plan by using early row flush and pushing down top-k information in a query plan that includes an inner join, according to some example embodiments of the present disclosure.

DETAILED DESCRIPTION

Figure 1:
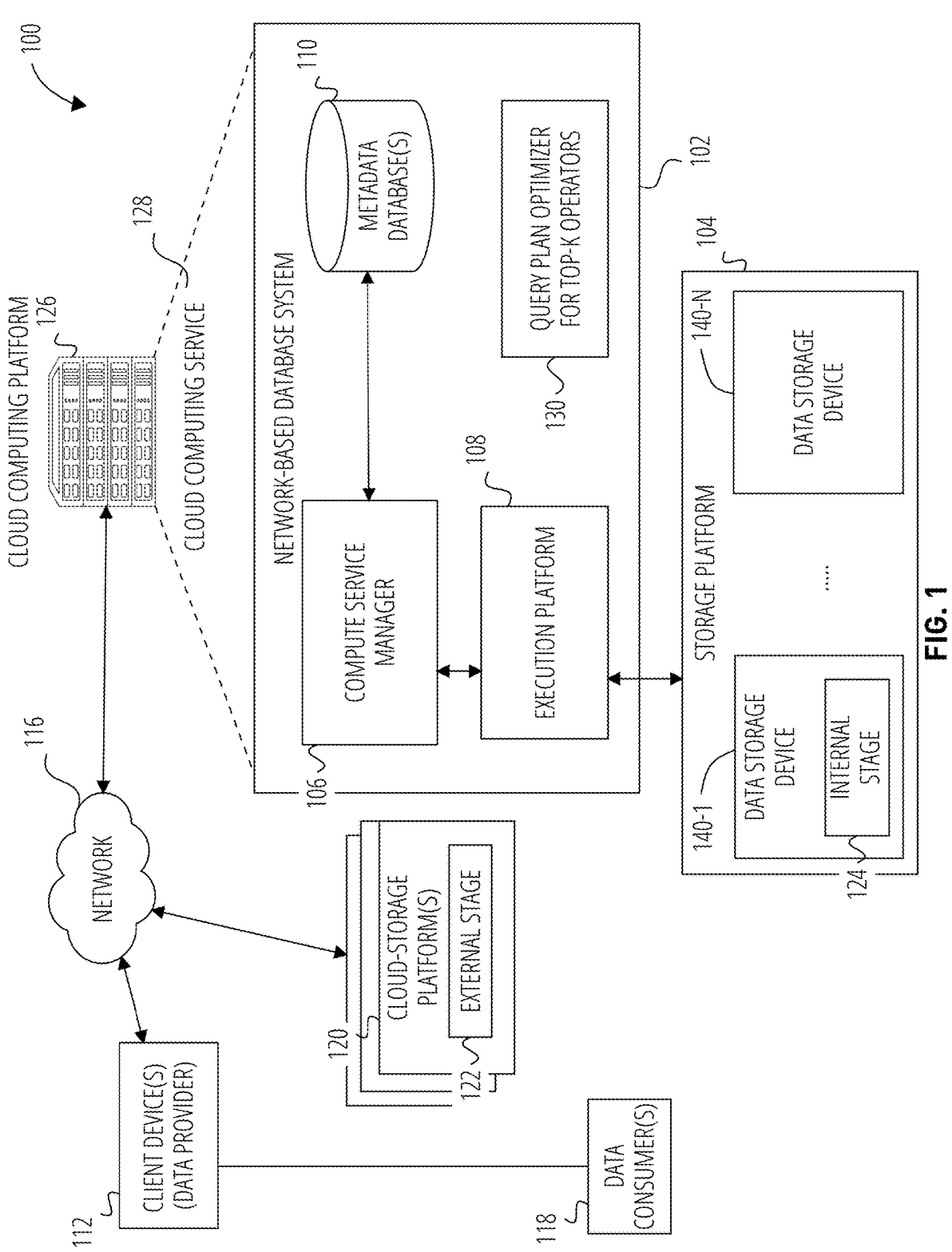
FIG. 1 illustrates an example computing environment comprising a database system in the example form of a network-based database system that includes a query plan optimizer, according to some example embodiments of the present disclosure.

Reference will now be made in detail to specific embodiments for carrying out the inventive subject matter. Examples of these specific embodiments are illustrated in the accompanying drawings, and specific details are outlined in the following description to provide a thorough understanding of the subject matter. It will be understood that these examples are not intended to limit the scope of the claims to the illustrated embodiments. On the contrary, they are intended to cover such alternatives, modifications, and equivalents as may be included within the scope of the disclosure.

Data platforms are widely used for data storage and data access in computing and communication contexts. With respect to architecture, a data platform could be an on-premises data platform, a network-based data platform (e.g., a cloud-based data platform), a combination of the two, and/or include another type of architecture. With respect to type of data processing, a data platform could implement online transactional processing (OLTP), online analytical processing (OLAP), a combination of the two, and/or another type of data processing. Moreover, a data platform could be or include a relational database management system (RDBMS) and/or one or more other types of database management systems.

In a typical implementation, a data platform includes one or more databases that are maintained on behalf of a customer account. Indeed, the data platform may include one or more databases that are respectively maintained in association with any number of customer accounts, as well as one or more databases associated with a system account (e.g., an administrative account) of the data platform, one or more other databases used for administrative purposes, and/or one or more other databases that are maintained in association with one or more other organizations and/or for any other purposes. A data platform may also store metadata in association with the data platform in general and in association with, as examples, particular databases and/or particular customer accounts as well.

Users and/or executing processes that are associated with a given customer account may, via one or more types of clients, be able to cause data to be ingested into the database, and may also be able to manipulate the data, add additional data, remove data, run queries against the data, generate views of the data, and so forth.

When certain information is to be extracted from a database, a query statement may be executed against the database data. A data platform may process the query and return certain data according to one or more query predicates that indicate what information should be returned by the query. The data platform extracts specific data from the database and formats that data into a readable form. However, it can be challenging to execute queries on a very large table because a significant amount of time and computing resources are required to scan an entire table to identify data that satisfies the query.

Traditional database systems (e.g., associated with or that are part of a data platform) employ various techniques to optimize query execution plans (hereafter, query plans). One conventional approach involves pushing down query limits to aggregate operators when queries are ordered by grouping keys. This basic optimization can help reduce the number of records that need to be processed. Additionally, data platforms can employ aggregation placement strategies to perform aggregation operations before joins to minimize the amount of data flowing through expensive join operations.

However, conventional optimization approaches have notable limitations. Generally, a bottom aggregation operator in a query plan buffers all rows before flushing them to a higher-level join operator (e.g., outer or inner join operators). Once one or more aggregation operators positioned below one or more join operators in the query plan flushes and top-k rows are determined by a higher-level top-k operator in the query plan, it is too late to gain benefit from filtering out the other rows (since the entire input has already been aggregated by the bottom aggregation operator, which can be very expensive).

Various example embodiments described herein provide for systems, methods, devices, instructions, and the like for optimizing a query plan to execute a query by using early row flush and pushing down top-k information in a query plan that includes an inner join, which can be used within a data platform (e.g., database) environment. In particular, various example embodiments use early row flush (or early flush) operations by one or more aggregation operators to eventually enable information (e.g., determined or established boundary value) from a top-k operator of a query plan to be pushed down (e.g., propagated down) the query plan and through one or more inner join operators (e.g., through multiple levels of inner join operators) of the query plan to one or more select operators (e.g., aggregation operators and table scan operators) positioned below the one or more inner join operators. For various example embodiments, the information (also referred to herein as top-k information) is pushed through an inner join to a child aggregation operator, a table scan operator, or both positioned in the query plan below an inner join operator.

According to various example embodiments, a data platform (e.g., a database system) generates a query plan based on a query (e.g., received from a client) for execution on a database (e.g., on multiple tables thereof), and optimizes (e.g., via a query plan optimizer) the query plan by determining (e.g., identifying) one or more opportunities to push down information of a top-k operator (e.g., top-k filter information) of the query plan below one or more inner join operators of the query plan. For various example embodiments, the query plan comprises at least one top-k operator, at least one inner join operator below the top-k operator, and at least one aggregation operator below the inner join operator. The top-k operator can be configured to order rows based on one or more order-by keys and limit output to a specific number of rows, and the inner join operator can be configured to join rows from multiple operators (e.g., nodes of the query plan) based on one or more join keys. For some example embodiments, the data platform determines a set of aggregation operators below the top-k operator (e.g., those above and below the inner join operator) in the query plan, and configures (e.g., modifies) a select aggregation operator (of the set of aggregation operators) to track distinct groupings (of rows) the select aggregation operator receives from a child operator (position below the select aggregation operator) and to manage early flushing operations. For example, the set of aggregation operators can include one or more aggregation operators above an inner join operator and one or more aggregation operators below the inner join operator and below on the probe side of the query plan. In particular, the select aggregation operator can maintain a count of distinct groupings (e.g., distinct grouping counter) and determine when to perform early flushes based on comparing this count against a threshold number of groupings. Depending on the example embodiment, the threshold number can be specific to the select aggregation operator or shared by the select aggregation operator and one or more other aggregation operators in the query plan. When early flushing is triggered in the select aggregation operator (e.g., the count maintained by the select aggregation operator surpasses the threshold number of the select aggregation operator), the select aggregation operator can flush a current set of distinct groupings (of the select aggregation operator) to a higher-level operator positioned above it in the query plan (e.g., the inner join operator). According to some example embodiments, after an early flush is performed, the select aggregation operator resets the count of distinct groupings, allowing the select aggregation operator to continue tracking a new set of distinct groupings. This process can be repeated multiple times as needed during the execution of the query plan. Different example embodiments can implement different approaches for tracking distinct groupings. For instance, the select aggregation operator can use a hash table for efficient tracking and management of distinct groupings, which enables effective duplicate checking and grouping management throughout the query execution process.

For some example embodiments, an aggregation operator is configured to dynamically adjust its threshold number of groupings, where the aggregation operator can determine whether the threshold number of groupings needs adjustment based on operational feedback. For instance, if a higher-level aggregation operator (positioned above a select aggregation operator in a query plan) is not receiving sufficient distinct groupings to perform its own early flush, the threshold of the select aggregation operator can be adjusted (e.g., increased) accordingly. For some example embodiments, a given aggregation operator determines whether to adjust its threshold number of groupings (and by how much) whenever its count of distinct groupings is reset. For some example embodiments, the threshold number is determined (e.g., adjusted) based on an overall limit information of a query.

According to some example embodiments, the top-k operator of the query plan eventually receives sufficient distinct groupings from a child operator (e.g., the inner join operator or intermediate operators between the top-k operator and the inner join operator) to determine (e.g., establish) a boundary value (e.g., an top-k boundary value). For some example embodiments, the top-k operator is configured to share (e.g., push) the determined boundary value (e.g., initial or updated boundary value) with one or more aggregation operators of the set of aggregation operators that are below the top-k operator and that include a set of order-by keys of the top-k operator. For example, the top-k information can be shared with each aggregation operator, in a series of aggregation operators from the top-k operator downward, that are on a probe-side of the query plan. In this way, the top-k information can be propagated downward from the top-k operator.

Upon receipt of the determined boundary value (e.g., initial boundary value) by an aggregation operator (e.g., the select aggregation operator), the aggregation operator can be configured to operate as (e.g., switch to operating as) a top-k aggregation operator based on the received boundary value. According to various example embodiments, an aggregation operator that receives the determined boundary value (from the top-k operator) and that begins operating as a top-k aggregation operator is configured to not update the boundary value it uses but, rather, uses initial and updated boundary values received by the aggregation operator from the top-k operator (which updates its boundary value as part of the top-k operator's normal operation). Additionally, for various example embodiments, the top-k operator is configured to share the determined boundary value (e.g., initial boundary value) with a table scan operator that is positioned below the set of aggregation operators (e.g., leaf node of the query plan) on a probe side of the query plan and where each aggregation operator between the top-k operator and the table scan operator includes the set of order-by keys of the top-k operator. In doing so, the table scan operator can use the received boundary value to prune rows prior to providing results to its parent operator positioned above the table scan operator in the query plan. For various example embodiments, a table scan operator that receives and uses (e.g., for row pruning) the determined boundary value from the top-k operator is configured to not update the boundary value it uses but, rather, uses the initial and updated boundary values received by the table scan operator from the top-k operator (which updates its boundary value as part of its normal operation).

Various example embodiments described herein provide a technical solution that addresses the challenge of efficient query processing, and does so by implementing intelligent early flushing mechanisms, dynamic threshold management, and pushing of top-k information. In doing so, some example embodiments described herein can help reduce unnecessary processing and improve overall query execution performance of a query plan that includes a top-k operator and an inner join operator. In particular, various example embodiments allow a bottom aggregation operator to early flush rows (e.g., periodically) to enable a top-k operator in a query plan to establish a boundary value (e.g., top-k boundary value). By enabling such a boundary to be established early during query plan execution, the aggregation operator can dynamically start filtering out rows that fall outside the top-k and apply pruning. This can drastically reduce query execution time, not only by reducing the work the aggregate itself needs to do, but also by reducing the number of rows that flow through an inner join operator of a query plan. Accordingly, use of various example embodiments can enable a data platform (e.g., a database system) to reduce or avoid excess records through inner join operators, which are typically very expensive and which can waste computational resources. Some example embodiments are described herein are implemented by a query compiler change to enable implementation of early flushing by aggregation operators in a query plan and enable pushing of top-k information (e.g., boundary value) to one or more aggregation operators and one or more table scan operators in a query plan that includes an inner join operator.

As used herein, a query plan (associated with a query) can comprise a tree structure with multiple nodes, where each node corresponds to a query plan operator or operation for executing the query on a database. For various example embodiments, a query plan defines how to extract specific data from the database (e.g., one or more tables or views of the database) and how to format the extracted data (e.g., into a readable form). Example query plan operators/operations can include, without limitation joins (e.g., inner or outer joins), aggregations, table scans, and filtering predicates. The query plan can be generated by parsing a query written in a structured language, such as Structured Query Language (SQL), that can be understood by a data platform (e.g., a database), and the query plan can determine what data should be located and how it should be returned. An individual query plan can be enhanced through various optimization techniques, such as pushing down query plan operators in the individual query plan (e.g., pushed below a join operator), adapting execution based on runtime metrics, and modifying query plan operator placement to reduce processing time and resource usage while maintaining semantic equivalence of the query.

As used herein, a table scan can comprise a query plan operator that reads data directly from a table or view of a database by examining all rows in a table/view to locate records that match a set of specified query predicates or conditions. A table scan operator can access the physical storage units where the tables/views are stored (e.g., files or blocks), and can extract the relevant data according to a set of query requirements. When performing a table scan, a table scan operator can examine a collection of records containing values of table/view attributes (e.g., columns) to identify and return data that satisfies a set of query conditions.

As used herein, an inner join operator is a query plan operator that filters and combines rows from two nodes of a query plan by matching specified join keys, where only rows that have matching values in both nodes are included in the output.

As used herein, a top-k operator can comprise a query plan operator that orders rows, by a specified set of order-by keys and limits output of the top-k operator to a specific number of rows (e.g., limit value). The top-k operator can maintain a data structure to track top-K groupings seen so far by the top-k operator based on the ordering specified by the set of order-by keys. The top-k operator can use a boundary value from the data structure to filter out rows that the top-k operator receives (from an operator positioned below the top-k operator in the query plan) and that would not be part of the final top-K results in the top-k operator outputs. For some example embodiments, a top-k operator is included in a query plan for a query when the query includes a LIMIT clause that specifies the specific number of rows (e.g., limit value), which can further include an ORDER BY clause to specify the set of order-by keys.

As used herein, an aggregation operator can comprise a query plan operator that groups rows based on a set of specified grouping keys (also referred to herein as group-by keys), where the aggregation operator can apply an aggregate function (e.g., such as sum, count, or average function) to compute a value (e.g., summary value) for each unique grouping (e.g., identified by the set of grouping keys). The aggregation operator can use (e.g., maintain) a hash table to track unique combinations of a set of group-by keys used by the aggregation operator and can accumulate an aggregate value (e.g., sum, count, or average value) for each unique grouping. When processing input rows, the aggregation operator can first check if a grouping (associated with a unique group-by key or unique combination of group-by keys) already exists in the aggregation operator's data structure (e.g., hash table) being used to track unique groupings. If the grouping already exists in the data structure, an aggregate value (e.g., sum, count, or average value) is updated for that grouping; if the grouping does not already exist in the data structure, the grouping is added to the data structure (e.g., a new grouping is created for tracking). The aggregation operator can work in conjunction with a join operator to reduce the number of records that need to be processed by performing aggregation before an expensive join operator and can be placed at different levels in the query plan to optimize performance.

As used herein, a top-k aggregation operator can comprise a query plan operator that orders rows the top-k aggregation operator receives from another operator in the query plan (e.g., an operator positioned below the top-k aggregation operator) by a set of specified ordering keys (also referred to herein as order-by keys) and limits the output to a specific number of rows while tracking (e.g., maintaining) distinct groupings based on the set of group-by keys. Depending on the example embodiment, the top-k aggregation operator can track unique top-k groupings using a data structure, such as a heap or an ordered data structure (e.g., ordered set) of the top-k groupings seen so far (ordered by the query's ordering) and uses a boundary value of that data structure to filter out records that are not in the current list of top-k groupings. The top-k aggregation operator can work in conjunction with a top-k aggregation node in a query plan to efficiently track unique top-k groupings.

Aspects of placement of adaptive aggregation operators (e.g., aggregation nodes) are described in U.S. Pat. No. 10,997,173, which is hereby incorporated by reference in its entirety.

Reference will now be made in detail to various example embodiments of the present disclosure, examples of which are illustrated in the appended drawings. The present disclosure may, however, be embodied in many different forms and should not be construed as being limited to the examples set forth herein.

FIG. 1 illustrates an example computing environment 100 comprising a database system in the example form of a network-based database system 102 that includes a query plan optimizer for top-k operators 130 (hereafter, the query plan optimizer 130), according to some example embodiments of the present disclosure. To avoid obscuring the inventive subject matter with unnecessary detail, various functional components that are not germane to conveying an understanding of the inventive subject matter have been omitted from FIG. 1. However, a skilled artisan will readily recognize that various additional functional components may be included as part of the computing environment 100 to facilitate additional functionality that is not specifically described herein. In other example embodiments, the computing environment may comprise another type of network-based database system or a cloud data platform. For example, in some example embodiments, the computing environment 100 may include a cloud computing platform 126 with the network-based database system 102, and a storage platform 104 (also referred to as a cloud storage platform). The cloud computing platform 126 provides computing resources and storage resources that may be acquired (purchased) or leased and configured to execute applications and store data.

Figure 2:
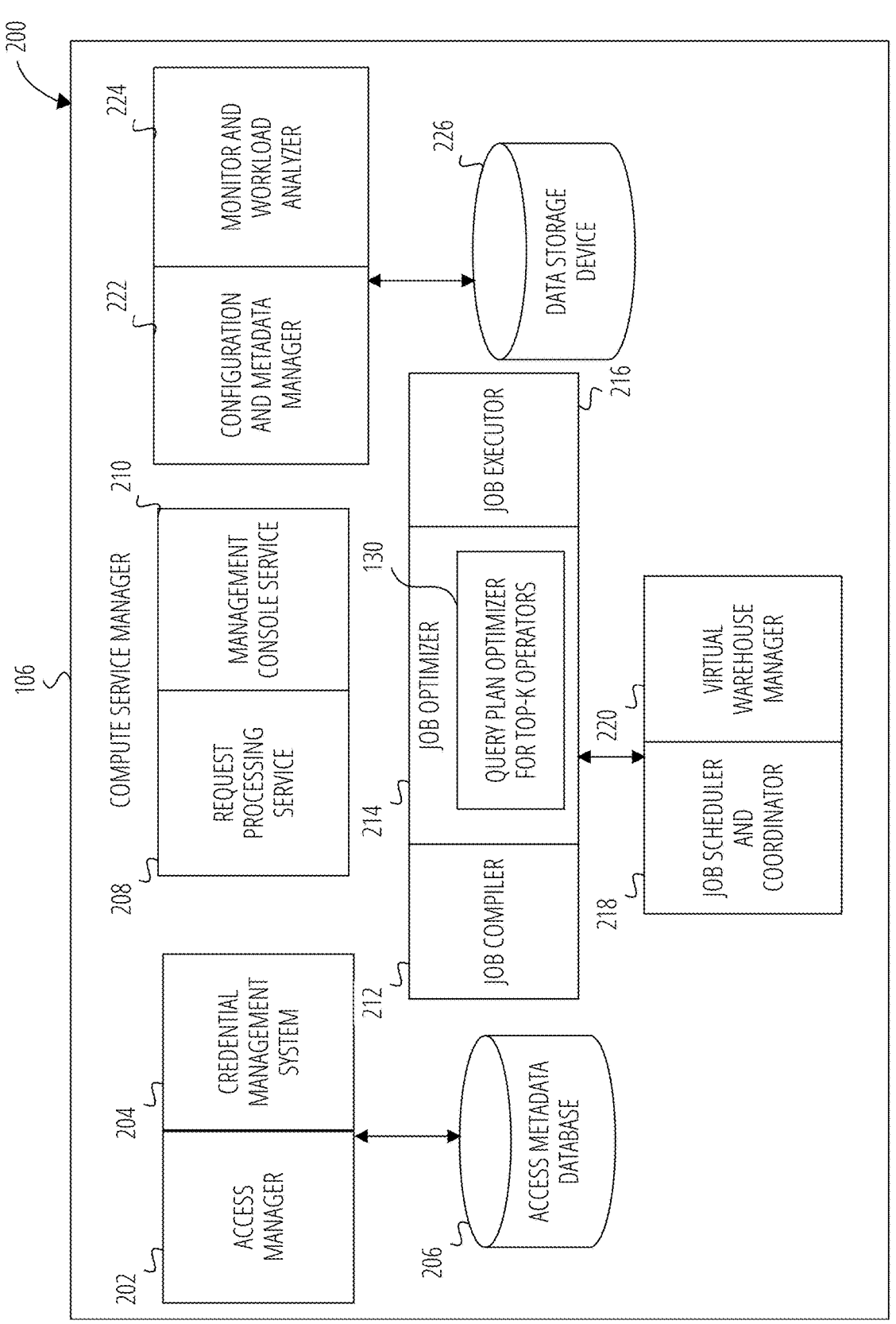
FIG. 2 is a block diagram illustrating components of a compute service manager, according to some example embodiments of the present disclosure.

The cloud computing platform 126 may host a cloud computing service 128 that facilitates storage of data on the cloud computing platform 126 (e.g., data management and access) and analysis functions (e.g., SQL queries, analysis), as well as other processing capabilities (e.g., configuring replication group objects as described herein). The cloud computing platform 126 may include a three-tier architecture: data storage (e.g., storage platforms 104), an execution platform 108 (e.g., providing query processing), and a compute service manager 106 providing cloud services. Though shown to be part of the network-based database system 102, the query plan optimizer 130 can be part of (e.g., included by) the compute service manager 106, as shown in FIG. 2.

It is often the case that organizations that are customers of a given data platform also maintain data storage (e.g., a data lake) that is external to the data platform (i.e., one or more external storage locations). For example, a company could be a customer of a particular data platform and also separately maintain storage of any number of files—be they unstructured files, semi-structured files, structured files, and/or files of one or more other types—on, as examples, one or more of their servers and/or on one or more cloud-storage platforms such as AMAZON WEB SERVICES™ (AWS™), MICROSOFT® AZURE®, GOOGLE CLOUD PLATFORM™, and/or the like. The customer's servers and cloud-storage platforms are both examples of what a given customer could use as what is referred to herein as an external storage location. The cloud computing platform 126 could also use a cloud-storage platform as what is referred to herein as an internal storage location concerning the data platform.

From the perspective of the network-based database system 102 of the cloud computing platform 126, one or more files that are stored at one or more storage locations are referred to herein as being organized into one or more of what is referred to herein as either "internal stages" or "external stages." Internal stages (e.g., internal stage 124) are stages that correspond to data storage at one or more internal storage locations, and where external stages are stages that correspond to data storage at one or more external storage locations. In this regard, external files can be stored in external stages at one or more external storage locations, and internal files can be stored in internal stages at one or more internal storage locations, which can include servers managed and controlled by the same organization (e.g., company) that manages and controls the data platform, and which can instead or in addition include data-storage resources operated by a storage provider (e.g., a cloud-storage platform) that is used by the data platform for its "internal" storage. The internal storage of a data platform is also referred to herein as the "storage platform" of the data platform. It is further noted that a given external file that a given customer stores at a given external storage location may or may not be stored in an external stage in the external storage location—i.e., in some data-platform implementations, it is a customer's choice whether to create one or more external stages (e.g., one or more external-stage objects) in the customer's data-platform account as an organizational and functional construct for conveniently interacting via the data platform with one or more external files.

As shown, the network-based database system 102 of the cloud computing platform 126 is in communication with the storage platforms 104 and cloud-storage platforms 120 (e.g., AWS®, Microsoft Azure Blob Storage®, or Google Cloud Storage). The network-based database system 102 is a network-based system used for reporting and analysis of integrated data from one or more disparate sources including one or more storage locations within the storage platform 104. The storage platform 104 comprises a plurality of computing machines and provides on-demand computer system resources such as data storage and computing power to the network-based database system 102.

The network-based database system 102 comprises a compute service manager 106, an execution platform 108, and one or more metadata databases 110. The network-based database system 102 hosts and provides data reporting and analysis services to multiple client accounts.

The compute service manager 106 coordinates and manages operations of the network-based database system 102. The compute service manager 106 also performs query optimization and compilation (e.g., into a query plan) as well as managing clusters of computing services that provide compute resources (also referred to as "virtual warehouses"). The compute service manager 106 can support any number of client accounts such as end-users providing data storage and retrieval requests, system administrators managing the systems and methods described herein, and other components/devices that interact with compute service manager 106.

The compute service manager 106 is also in communication with a client device 112. The client device 112 corresponds to a user of one of the multiple client accounts supported by the network-based database system 102. A user may utilize the client device 112 to submit data storage, retrieval, and analysis requests to the compute service manager 106. Client device 112 (also referred to as remote computing device or user client device 112) may include one or more of a laptop computer, a desktop computer, a mobile phone (e.g., a smartphone), a tablet computer, a cloud-hosted computer, cloud-hosted serverless processes, or other computing processes or devices may be used (e.g., by a data provider) to access services provided by the cloud computing platform 126 (e.g., cloud computing service 128) by way of a network 116, such as the Internet or a private network. A data consumer 118 can use another computing device to access the data of the data provider (e.g., data obtained via the client device 112).

In the description below, actions are ascribed to users, particularly consumers and providers. Such actions shall be understood to be performed concerning client device (or devices) 112 operated by such users. For example, a notification to a user may be understood to be a notification transmitted to the client device 112, input or instruction from a user may be understood to be received by way of the client device 112, and interaction with an interface by a user shall be understood to be interaction with the interface on the client device 112. In addition, database operations (joining, aggregating, analysis, etc.) ascribed to a user (consumer or provider) shall be understood to include performing such actions by the cloud computing service 128 in response to an instruction from that user.

The compute service manager 106 is also coupled to one or more metadata databases 110 that store metadata about various functions and aspects associated with the network-based database system 102 and its users. For example, a metadata database 110 may include a summary of data stored in remote data storage systems as well as data available from a local cache. Additionally, a metadata database 110 may include information regarding how data is organized in remote data storage systems (e.g., the cloud storage platform 104) and the local caches. Information stored by a metadata database 110 allows systems and services to determine whether a piece of data needs to be accessed without loading or accessing the actual data from a storage device. In some example embodiments, metadata database 110 is configured to store account object metadata (e.g., account objects used in connection with a replication group object).

Figure 3:
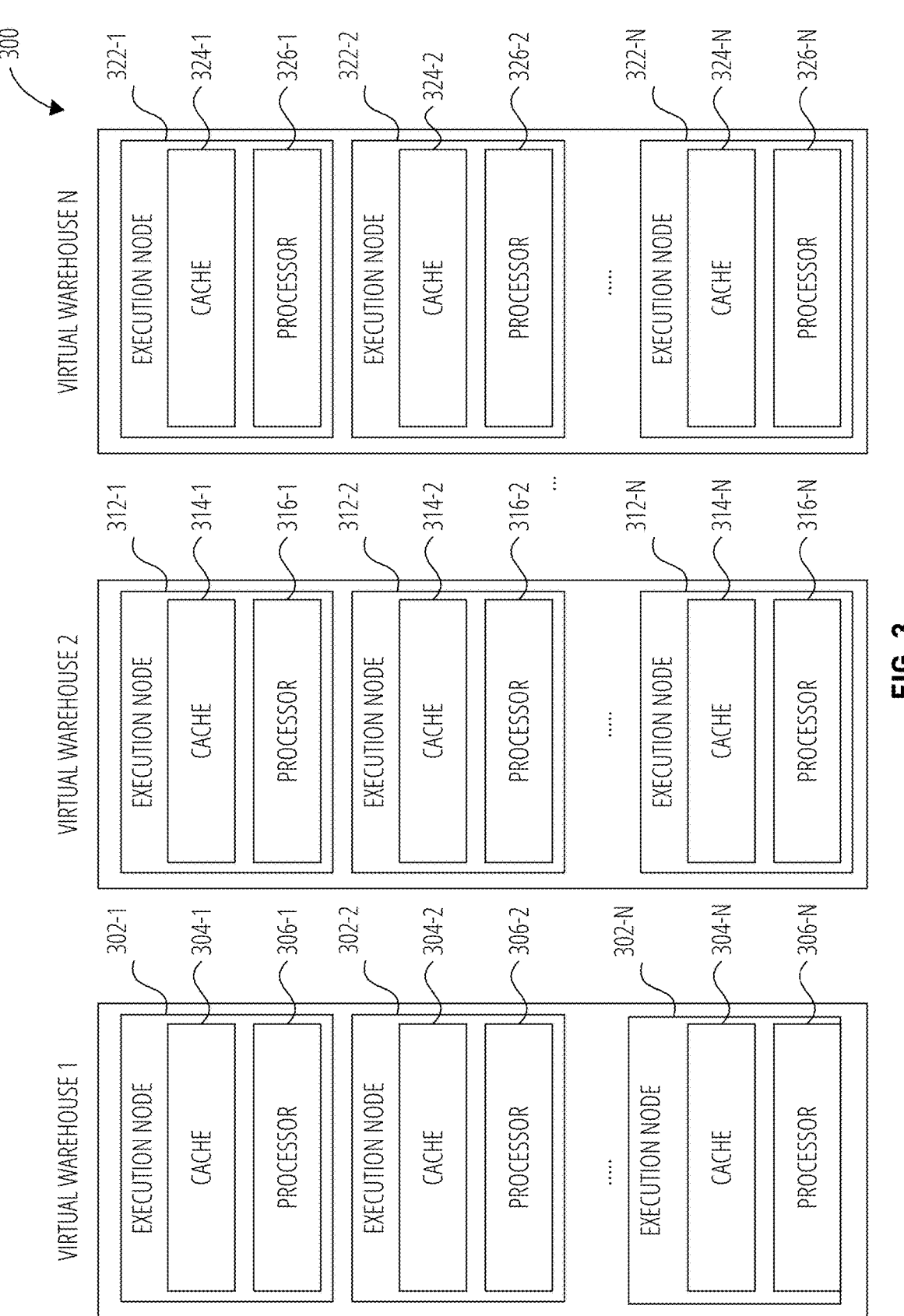
FIG. 3 is a block diagram illustrating components of an execution platform, according to some example embodiments of the present disclosure.

The compute service manager 106 is further coupled to the execution platform 108, which provides multiple computing resources that execute various data storage and data retrieval tasks. As illustrated in FIG. 3, the execution platform 108 comprises a plurality of compute nodes. The execution platform 108 is coupled to storage platform 104 and cloud-storage platforms 120. The storage platform 104 comprises multiple data storage devices 140-1 to 140-N. In some example embodiments, the data storage devices 140-1 to 140-N are cloud-based storage devices located in one or more geographic locations. For example, the data storage devices 140-1 to 140-N may be part of a public cloud infrastructure or a private cloud infrastructure. The data storage devices 140-1 to 140-N may be hard disk drives (HDDs), solid-state drives (SSDs), storage clusters, Amazon S3™ storage systems, or any other data-storage technology. Additionally, the cloud storage platform 104 may include distributed file systems (such as Hadoop Distributed File Systems (HDFS)), object storage systems, and the like. In some example embodiments, at least one internal stage 124 may reside on one or more of the data storage devices 140-1-140-N, and at least one external stage 122 may reside on one or more of the cloud-storage platforms 120.

In some example embodiments, communication links between elements of the computing environment 100 are implemented via one or more data communication networks. These data communication networks may utilize any communication protocol and any type of communication medium. In some example embodiments, the data communication networks are a combination of two or more data communication networks (or sub-networks) coupled to one another. In alternative embodiments, these communication links are implemented using any type of communication medium and any communication protocol.

The compute service manager 106, metadata database(s) 110, execution platform 108, and storage platform 104, are shown in FIG. 1 as individual discrete components. However, each of the compute service manager 106, metadata database(s) 110, execution platform 108, and storage platform 104 may be implemented as a distributed system (e.g., distributed across multiple systems/platforms at multiple geographic locations). Additionally, each of the compute service manager 106, metadata database(s) 110, execution platform 108, and storage platform 104 can be scaled up or down (independently of one another) depending on changes to the requests received and the changing needs of the network-based database system 102. Thus, in the described example embodiments, the network-based database system 102 is dynamic and supports regular changes to meet the current data processing needs.

During a typical operation, the network-based database system 102 processes multiple jobs determined by the compute service manager 106. These jobs are scheduled and managed by the compute service manager 106 to determine when and how to execute the job. For example, the compute service manager 106 may divide the job into multiple discrete tasks and may determine what data is needed to execute each of the multiple discrete tasks. The compute service manager 106 may assign each of the multiple discrete tasks to one or more nodes of the execution platform 108 to process the task. The compute service manager 106 may determine what data is needed to process a task and further determine which nodes within the execution platform 108 are best suited to process the task. Some nodes may have already cached the data needed to process the task and, therefore, be a good candidate for processing the task. Metadata stored in a metadata database 110 assists the compute service manager 106 in determining which nodes in the execution platform 108 have already cached at least a portion of the data needed to process the task. One or more nodes in the execution platform 108 process the task using data cached by the nodes and, if necessary, data retrieved from the storage platform 104. It is desirable to retrieve as much data as possible from caches within the execution platform 108 because the retrieval speed is typically much faster than retrieving data from the storage platform 104.

As shown in FIG. 1, the cloud computing platform 126 of the computing environment 100 separates the execution platform 108 from the storage platform 104. In this arrangement, the processing resources and cache resources in the execution platform 108 operate independently of the data storage devices 140-1 to 140-N in the storage platform 104. Thus, the computing resources and cache resources are not restricted to specific data storage devices 140-1 to 140-N. Instead, all computing resources and all cache resources may retrieve data from, and store data to, any of the data storage resources in the storage platform 104.

As also shown, the job optimizer 214 comprises the query plan optimizer 130, which enables the network-based database system 102 (e.g., one or more of its components) to optimize a query plan for executing a query (e.g., received from the client device 112) by using early row flush and pushing down top-k information in a query plan that includes an inner join, in accordance with various example embodiments described herein. According to various example embodiments, the query plan optimizer 130 accesses a query plan for execution on a plurality of tables, where the query plan comprises a plurality of operators, and where the plurality of operators comprises a top-k operator and an inner join operator positioned below the top-k operator in the query plan. For various example embodiments, the top-k operator is configured to order rows by a set of order-by keys and to limit a number of rows provided by the top-k operator to a specific number of rows, and the inner join operator is configured to join rows received from at least two nodes of the query plan based on a set of join keys. For some example embodiments, the query plan optimizer 130 determines a set of aggregation operators below the top-k operator in the query plan. The query plan optimizer 130 can modify the query plan by configuring a select aggregation operator, in the set of aggregation operators, to perform operations to implement an early flush mechanism. For various example embodiments, the operations comprise tracking (e.g., maintaining) a count of distinct groupings observed by the select aggregation operator. As the select aggregation operator receives rows from a child operator in the query plan, the select aggregation operator can determine (e.g., periodically) whether to perform an early flush of distinct groupings based on the count of distinct groupings and a threshold number of groupings of the select aggregation operator. In response to the select aggregation operator determining to perform the early flush of distinct groupings, the select aggregation operator can flush (e.g., early flush), from the select aggregation operator to a higher-level operator positioned above the select aggregation operator in the query plan, a current set of distinct groupings observed by the select aggregation operator since the last time the count of distinct groupings was initialized or reset. After the flush, the select aggregation operator can reset the count of distinct groupings. After the reset, the select aggregation operator can determine whether to adjust the threshold number of groupings and do so based on the determination. Alternatively, or additionally, after the reset, the select aggregation operator can resume tracking the count of distinct groupings observed by the select aggregation operator and flush again when appropriate.

For various example embodiments, where an individual set of group keys of each aggregation operator between the select aggregation operator (e.g., on the probe side of the query plan) and the top-k operator includes the set of order-by keys of the top-k operator, the select aggregation operator is configured (e.g., by the query plan optimizer 130) to receive top-k information from the top-k operator, where the top-k operator information comprises a boundary value established by the top-k operator. The top-k operator information can further comprise limit information used by the top-k operator (e.g., specified number of distinct groupings). In response to receiving the top-k information from the top-k operator, the select aggregation operator can change to a top-k aggregation operator that applies a top-k operation based on at least a portion of top-k operator information (e.g., the boundary value). Additionally, the select aggregation operator can receive from the top-k operator updated top-k information, where the top-k aggregation operator applies the top-k operation based on the updated top-k operator information. As a top-k aggregation operator, the select aggregation operator can forego updating its boundary value and rely on the initial boundary value and any updated boundary values the select aggregation operator receives from the top-k operator. For various example embodiments, the top-k operator is configured (e.g., by the query plan optimizer 130) to share top-k information (e.g., push or propagate top-k information down the query plan) at least when the top-k operator determines (e.g., establishes) its boundary value or updates its boundary value. Additionally, for various example embodiments, the top-k operator is configured (e.g., by query plan optimizer 130) to share the determined boundary value (e.g., initial and subsequently updated boundary value) with a table scan operator that is positioned below the set of aggregation operators (e.g., leaf node of the query plan) on a probe side of the query plan and where each aggregation operator between the top-k operator and the table scan operator includes the set of order-by keys of the top-k operator.

FIG. 2 is a block diagram 200 illustrating components of the compute service manager 106, according to some example embodiments of the present disclosure. As shown in FIG. 2, the compute service manager 106 includes an access manager 202 and a credential management system 204 coupled to access metadata database 206, which is an example of the metadata database(s) 110. As shown, the compute service manager 106 can include at least some portion of the query plan optimizer 130 to implement one or more features of optimizing a query plan in accordance with various example embodiments.

Access manager 202 handles authentication and authorization tasks for the systems described herein. The credential management system 204 facilitates use of remote stored credentials to access external resources such as data resources in a remote storage device. As used herein, the remote storage devices may also be referred to as "persistent storage devices" or "shared storage devices." For example, the credential management system 204 may create and maintain remote credential store definitions and credential objects (e.g., in the access metadata database 206). A remote credential store definition identifies a remote credential store and includes access information to access security credentials from the remote credential store. A credential object identifies one or more security credentials using non-sensitive information (e.g., text strings) that are to be retrieved from a remote credential store for use in accessing an external resource. When a request invoking an external resource is received at run time, the credential management system 204 and access manager 202 use information stored in the access metadata database 206 (e.g., a credential object and a credential store definition) to retrieve security credentials used to access the external resource from a remote credential store.

A request processing service 208 manages received data storage requests and data retrieval requests (e.g., jobs to be performed on database data). For example, the request processing service execution platform 108 may determine the data to process a received query (e.g., a data storage request or data retrieval request). The data can be stored in a cache within the execution platform 108 or in a data storage device in storage platform 104.

A management console service 210 supports access to various systems and processes by administrators and other system managers. Additionally, the management console service 210 may receive a request to execute a job and monitor the workload on the system.

The compute service manager 106 also includes a job compiler 212, a job optimizer 214, and a job executor 216. The job compiler 212 parses a job into multiple discrete tasks and generates the execution code for each of the multiple discrete tasks. The job optimizer 214 determines the best method to execute the multiple discrete tasks based on the data that needs to be processed. The job optimizer 214 also handles various data pruning operations and other data optimization techniques to improve the speed and efficiency of executing the job. The job executor 216 executes the execution code for jobs received from a queue or determined by the compute service manager 106.

A job scheduler and coordinator 218 sends received jobs to the appropriate services or systems for compilation, optimization, and dispatch to the execution platform 108. For example, jobs can be prioritized and then processed in that prioritized order. In an embodiment, the job scheduler and coordinator 218 determines a priority for internal jobs that are scheduled by the compute service manager 106 with other "outside" jobs such as user queries that can be scheduled by other systems in the database but may utilize the same processing resources in the execution platform 108. In some example embodiments, the job scheduler and coordinator 218 identifies or assigns particular nodes in the execution platform 108 to process particular tasks. A virtual warehouse manager 220 manages the operation of multiple virtual warehouses implemented in the execution platform 108. For example, the virtual warehouse manager 220 may generate query plans for executing received queries.

Additionally, the compute service manager 106 includes a configuration and metadata manager 222, which manages the information related to the data stored in the remote data storage devices and in the local buffers (e.g., the buffers in execution platform 108). The configuration and metadata manager 222 uses metadata to determine which data files need to be accessed to retrieve data for processing a particular task or job. A monitor and workload analyzer 224 oversees processes performed by the compute service manager 106 and manages the distribution of tasks (e.g., workload) across the virtual warehouses and execution nodes in the execution platform 108. The monitor and workload analyzer 224 also redistributes tasks, as needed, based on changing workloads throughout the cloud computing platform 126 and may further redistribute tasks based on a user (e.g., "external") query workload that may also be processed by the execution platform 108. The configuration and metadata manager 222 and the monitor and workload analyzer 224 are coupled to a data storage device 226. Data storage device 226 in FIG. 2 represents any data storage device within the storage platform 104. For example, data storage device 226 may represent buffers in execution platform 108, storage devices in cloud storage platform 104, or any other storage device.

As described in embodiments herein, the compute service manager 106 validates all communication from an execution platform (e.g., the execution platform 108) to validate that the content and context of that communication are consistent with the task(s) known to be assigned to the execution platform. For example, an instance of the execution platform executing a query A should not be allowed to request access to data-source D (e.g., data storage device 226) that is not relevant to query A. Similarly, a given execution node (e.g., execution node 302-1) may need to communicate with another execution node (e.g., execution node 302-2), and should be disallowed from communicating with a third execution node (e.g., execution node 312-1) and any such illicit communication can be recorded (e.g., in a log or other location). Also, the information stored on a given execution node is restricted to data relevant to the current query and any other data is unusable, rendered so by destruction or encryption where the key is unavailable.

FIG. 3 is a block diagram 300 illustrating components of the execution platform 108, according to some example embodiments of the present disclosure. As shown in FIG. 3, the execution platform 108 includes multiple virtual warehouses, including virtual warehouse 1, virtual warehouse 2, and virtual warehouse N. Each virtual warehouse includes multiple execution nodes that each include a data cache and a processor. The virtual warehouses can execute multiple tasks in parallel by using the multiple execution nodes. As discussed herein, the execution platform 108 can add new virtual warehouses and drop existing virtual warehouses in real-time based on the current processing needs of the systems and users. This flexibility allows the execution platform 108 to quickly deploy large amounts of computing resources when needed without being forced to continue paying for those computing resources when they are no longer needed. All virtual warehouses can access data from any data storage device (e.g., any storage device in storage platform 104).

Although each virtual warehouse shown in FIG. 3 includes three execution nodes, a particular virtual warehouse may include any number of execution nodes. Further, the number of execution nodes in a virtual warehouse is dynamic, such that new execution nodes are created when additional demand is present, and existing execution nodes are deleted when they are no longer useful.

Each virtual warehouse is capable of accessing any of the data storage devices 140-1 to 140-N shown in FIG. 1. Thus, the virtual warehouses are not necessarily assigned to a specific data storage device 140-1 to 140-N and, instead, can access data from any of the data storage devices 140-1 to 140-N within the storage platform 104. Similarly, each of the execution nodes shown in FIG. 3 can access data from any of the data storage devices 140-1 to 140-N. In some example embodiments, a particular virtual warehouse or a particular execution node can be temporarily assigned to a specific data storage device, but the virtual warehouse or execution node may later access data from any other data storage device.

In the example of FIG. 3, virtual warehouse 1 includes three execution nodes 302-1, 302-2, and 302-N. Execution node 302-1 includes a cache 304-1 and a processor 306-1. Execution node 302-2 includes a cache 304-2 and a processor 306-2. Execution node 302-N includes a cache 304-N and a processor 306-N. Each execution node 302-1, 302-2, and 302-N is associated with processing one or more data storage and/or data retrieval tasks. For example, a virtual warehouse may handle data storage and data retrieval tasks associated with an internal service, such as a clustering service, a materialized view refresh service, a file compaction service, a storage procedure service, or a file upgrade service. In other implementations, a particular virtual warehouse may handle data storage and data retrieval tasks associated with a particular data storage system or a particular category of data.

Similar to virtual warehouse 1 discussed above, virtual warehouse 2 includes three execution nodes 312-1, 312-2, and 312-N. Execution node 312-1 includes a cache 314-1 and a processor 316-1. Execution node 312-2 includes a cache 314-2 and a processor 316-2. Execution node 312-N includes a cache 314-N and a processor 316-N. Additionally, virtual warehouse N includes three execution nodes 322-1, 322-2, and 322-N. Execution node 322-1 includes a cache 324-1 and a processor 326-1. Execution node 322-2 includes a cache 324-2 and a processor 326-2. Execution node 322-N includes a cache 324-N and a processor 326-N.

In some example embodiments, the execution nodes shown in FIG. 3 are stateless with respect to the data being cached by the execution nodes. For example, these execution nodes do not store or otherwise maintain state information about the execution node, or the data being cached by a particular execution node. Thus, in the event of an execution node failure, the failed node can be transparently replaced by another node. Since there is no state information associated with the failed execution node, the new (replacement) execution node can easily replace the failed node without concern for recreating a particular state.

Although the execution nodes shown in FIG. 3 each includes one data cache and one processor, alternate embodiments may include execution nodes containing any number of processors and any number of caches. Additionally, the caches may vary in size among the different execution nodes. The caches shown in FIG. 3 store, in the local execution node, data that was retrieved from one or more data storage devices in storage platform 104. Thus, the caches reduce or eliminate the bottleneck problems occurring in platforms that consistently retrieve data from remote storage systems. Instead of repeatedly accessing data from the remote storage devices, the systems and methods described herein access data from the caches in the execution nodes, which is significantly faster and avoids the bottleneck problem discussed above. In some example embodiments, the caches are implemented using high-speed memory devices that provide fast access to the cached data. Each cache can store data from any of the storage devices in the storage platform 104.

Further, the cache resources and computing resources may vary between different execution nodes. For example, one execution node may contain significant computing resources and minimal cache resources, making the execution node useful for tasks that require significant computing resources. Another execution node may contain significant cache resources and minimal computing resources, making this execution node useful for tasks that require caching of large amounts of data. Yet another execution node may contain cache resources providing faster input-output operations, useful for tasks that require fast scanning of large amounts of data. In some example embodiments, the cache resources and computing resources associated with a particular execution node are determined when the execution node is created, based on the expected tasks to be performed by the execution node.

Additionally, the cache resources and computing resources associated with a particular execution node may change over time based on changing tasks performed by the execution node. For example, an execution node may be assigned more processing resources if the tasks performed by the execution node become more processor intensive. Similarly, an execution node may be assigned more cache resources if the tasks performed by the execution node require a larger cache capacity.

Although virtual warehouses 1, 2, and N are associated with the same execution platform 108, the virtual warehouses can be implemented using multiple computing systems at multiple geographic locations. For example, virtual warehouse 1 can be implemented by a computing system at a first geographic location, while virtual warehouses 2 and N are implemented by another computing system at a second geographic location. In some example embodiments, these different computing systems are cloud-based computing systems maintained by one or more different entities.

Additionally, each virtual warehouse is shown in FIG. 3 as having multiple execution nodes. The multiple execution nodes associated with each virtual warehouse can be implemented using multiple computing systems at multiple geographic locations. For example, an instance of virtual warehouse 1 implements execution nodes 302-1 and 302-2 on one computing platform at a geographic location and implements execution node 302-N at a different computing platform at another geographic location. Selecting particular computing systems to implement an execution node may depend on various factors, such as the level of resources needed for a particular execution node (e.g., processing resource requirements and cache requirements), the resources available at particular computing systems, communication capabilities of networks within a geographic location or between geographic locations, and which computing systems are already implementing other execution nodes in the virtual warehouse.

Execution platform 108 is also fault tolerant. For example, if one virtual warehouse fails, that virtual warehouse is quickly replaced with a different virtual warehouse at a different geographic location. A particular execution platform 108 may include any number of virtual warehouses. Additionally, the number of virtual warehouses in a particular execution platform is dynamic, such that new virtual warehouses are created when additional processing and/or caching resources are needed. Similarly, existing virtual warehouses can be deleted when the resources associated with the virtual warehouse are no longer useful.

In some example embodiments, the virtual warehouses may operate on the same data in storage platform 104, but each virtual warehouse has its own execution nodes with independent processing and caching resources. This configuration allows requests on different virtual warehouses to be processed independently and with no interference between the requests. This independent processing, combined with the ability to dynamically add and remove virtual warehouses, supports the addition of new processing capacity for new users without impacting the performance.

Figure 4:
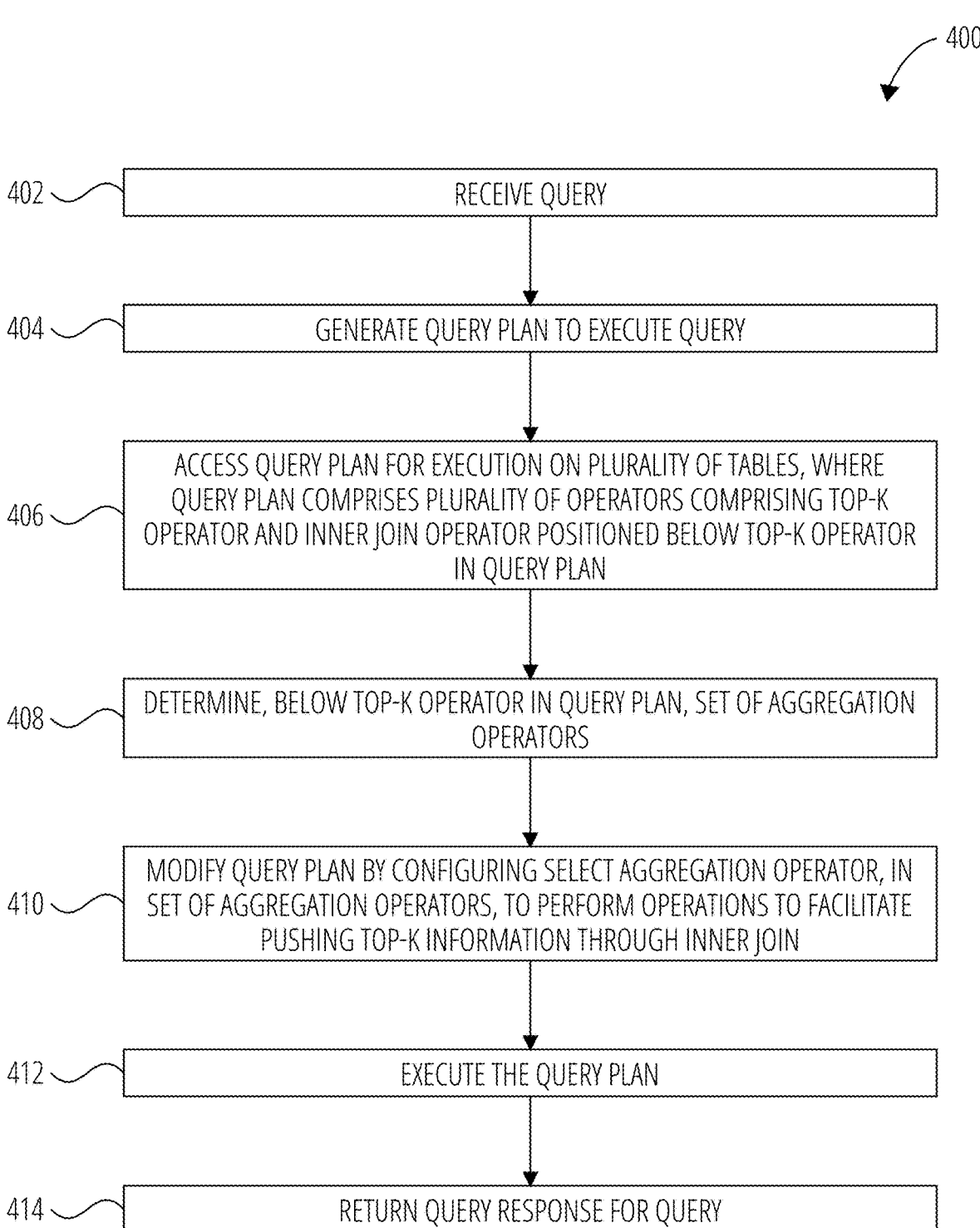

FIG. 4 through FIG. 6 are flowcharts of example methods 400, 500, 600 for optimizing a query plan by using early row flush and pushing down top-k information in a query plan that includes an inner join, according to some example embodiments of the present disclosure. Any of methods 400, 500, 600 may be embodied in computer-readable instructions for execution by one or more hardware components (e.g., one or more processors) such that one or more operations of methods 400, 500, 600 can be performed by components of the network-based database system 102, such as the query plan optimizer 130, which may be implemented by machine 1100 of FIG. 11. Accordingly, each of methods 400, 500, 600 is described below, by way of example with reference thereto. However, it shall be appreciated that one or more of methods 400, 500, 600 may be deployed on various other hardware configurations and is not intended to be limited to deployment within the network-based database system 102.

At operation 402, a processor (e.g., implementing the query plan optimizer 130) receives a query for execution on a database (e.g., one or more tables or views of the database). For some example embodiments, the query comprises a GROUP BY clause specifying one or more group-by keys, an ORDER BY clause specifying one or more order-by keys, a LIMIT clause specifying a specific number of rows, and one or more INNER JOIN clauses each specifying an inner join of multiple tables of the database and one or more join keys for the inner join. Based on the query, at operation 404 the processor generates a query plan (e.g., such as those illustrated and described with respect to FIG. 7) to execute the query on the database.

For operation 406, the processor accesses the query plan for execution on a plurality of tables, where the query plan comprises a plurality of operators. According to various example embodiments, the plurality of operators comprises a top-k operator and an inner join operator positioned below the top-k operator in the query plan. For various example embodiments, the top-k operator is configured to order rows by a set of order-by keys and to limit a number of rows provided by the top-k operator to a specific number of rows. Additionally, for some example embodiments, the inner join operator is configured to join rows received from at least two nodes of the query plan based on a set of join keys.

At operation 408, the processor determines a set of aggregation operators (not necessarily consecutive) below the top-k operator in the query plan. In the query plan, each of aggregation operator between the top-k operator and a table scan operator (e.g., on a probe side of the query plan) may or may not include the set of order-by keys.

Subsequently, at operation 410, the processor modifies the query plan by configuring a select aggregation operator (e.g., each aggregation operator), in the set of aggregation operators, to perform one or more operations to facilitate (e.g., implement) early flush, pushing down top-k information, or both. More regarding the one or more operations performed by the select aggregation operator (as configured by 410) is illustrated and described with respect to FIG. 5 and FIG. 6.

Eventually, at operation 412, the processor executes the query plan on (e.g., with respect to) the database and, at operation 414, the processor returns a query response (generated from the execution) in response to the query.

Referring now to FIG. 5, method 500 represents one or more operations that a select aggregation operator is configured by a processor (e.g., query plan optimizer 130 of FIG. 1) to perform (e.g., by operation 410 of method 400 described with respect to FIG. 4) during operation (e.g., execution) of the select aggregation operator. At operation 502, the select aggregation operator (e.g., as configured by the query plan optimizer 130) tracks a count of distinct groupings observed by the select aggregation operator. The select aggregation operator tracks the count of distinct groupings based on a hash table maintained by the select aggregation operator. For operation 504, the select aggregation operator determines whether to perform an early flush of distinct groupings (e.g., observed since the last time the count was reset or initialized) based on the count of distinct groupings and a threshold number of groupings of the select aggregation operator. For instance, the select aggregation operator can determine to perform the early flush in response to the count surpassing the threshold number. At decision block 506, in response to the select aggregation operator determining to perform the early flush of distinct groupings, method 500 proceeds to operation 508, otherwise method 500 proceeds to operation 512.

At operation 508, the select aggregation operator flushes (e.g., early flushes), from the select aggregation operator to a higher-level operator positioned above the select aggregation operator in the query plan, a current set of distinct groupings observed by the select aggregation operator since the last time the count of distinct groupings was initialized or reset. The higher-level operator can be an inner join operator of the query plan or some other operator (e.g., another aggregation operator). The number of distinct groupings in the current set of distinct groupings that is flushed (to the higher-level operator) can be more than or equal to the threshold number of groupings. Additionally, at operation 510, the select aggregation operator resets the count of distinct groupings (e.g., after the early flush is performed).

During operation 512, the select aggregation operator determines whether the threshold number of groupings of the select aggregation operator is to be adjusted. At decision block 514, in response to the select aggregation operator determining that the threshold number of groupings is to be adjusted, method 500 proceeds to operation 516, where the select aggregation operator adjusts the threshold number of groupings of the select aggregation operator. For some example embodiments, the select aggregation operator determines to adjust (e.g., update) the threshold number based on operational feedback. For instance, if a higher-level aggregation operator (positioned above a select aggregation operator in a query plan) is determined to not be receiving sufficient distinct groupings to perform its own early flush the threshold of the select aggregation operator can be adjusted accordingly. For some example embodiments, the adjustment of the threshold number of groupings is based on the operational performance of the top-k operator (e.g., not receiving enough rows for the top-k operator to establish an initial boundary value). Generally, the adjusting of the threshold number of groupings can comprise increasing the threshold number of groupings. Depending on the example embodiment, the increase can be a multiple of an initial threshold number (e.g., if the initial threshold number is K, a sequence of adjustments over time can comprise $2 \times K$ during a first adjustment, $4 \times K$ during a second adjustment, a $8 \times K$ during a third adjustment, and so on). The initial threshold number can be determined based on the limit information of the top-k operator (e.g., if the limit of the top-k operator is 100, the initial threshold number of each aggregation operator can be set to 100 as well). The initial threshold can also be determined by a fixed multiple of the limit (e.g.m $1.2 \times 100 = 120$), or a function of the limit and the estimated selectivity of the joins/filters between the parent aggregate operator and bottom aggregate operators.

At decision block 514, in response to the select aggregation operator determining that the threshold number of groupings is not to be adjusted (e.g., at least not right now), method 500 proceeds to operation 520.

For operation 518, the select aggregation operator continues the tracking of the count of distinct groupings observed by the select aggregation operator. At operation 520, the processor receives one or more additional rows from a lower-level operator positioned below the select aggregation operator in the query plan. For example, the lower-level operator comprises a table scan operator. After receiving one or more additional rows, method 500 can return to operation 504, where the select aggregation operator redetermines whether to perform an early flush of distinct groupings (e.g., observed since the last time the count was reset at operation 510) based on the count of distinct groupings and the threshold number of groupings of the select aggregation operator (e.g., as updated at operation 516). In this way, the select aggregation operator can continue evaluating and performing an early flush as needed, which can assist the top-k operator in establishing a boundary value earlier rather than by conventional methodologies. The select aggregation operator can continue performing the operations of method 500 until the select aggregation operator receives top-k information, as illustrated and described with respect to method 600 of FIG. 6.

Depending on the example embodiment, the adjustment of the threshold number of the select aggregation operator can be determined by an exponential backoff approach (e.g., as described above with respect to method 500), a probabilistic backoff approach, or a filter rate backoff approach.

With respect to a probabilistic backoff approach, some example embodiments use the information about how many rows made it to the top-k operator to choose earlier thresholds (e.g., during operation 516). For example, where an initial threshold number is set to 100 and 90 rows made it to the top-k operator, some example embodiments estimate that the probability of a distinct grouping at the select aggregation operator making it to the top-k operator is 90/100=0.9. Assuming a random distribution of rows and independence, the number of rows that make it to the top-k operator follows a negative binomial distribution with parameters r=100 and p=0.9. With this information, various example embodiments calculate the expected number of rows that need to be flushed to have 100 rows reach the top-k operator. As a variation, an example embodiment can use a value higher than the mean that gives 95% confidence of reaching 100 rows at the top-k operator. In such variations, the value of k would be such that CDF(k)≥0.95, where CDF(k) is the CDF of the above negative binomial distribution. The expectation in this example would be approximately 111 rows, so this would become our next (adjusted) threshold number for the select aggregation operator. This is much less than a threshold number adjusted by an exponential backoff rule (e.g., which could result in a value of 200), potentially allowing us to establish a boundary value earlier.

With respect to a filter rate backoff approach, some example embodiments use the observed filter rate of a current boundary to determine when the select aggregation operator should try to early flush. Returning to the above example, the select aggregation operator would still perform the first early flush at 100 rows. After the boundary value is established, the select aggregation operator tracks the proportion of rows that have been filtered by the boundary value. If the current boundary is effective, the select aggregation operator can expect this proportion to be high. Once the select aggregation operator has received a fixed, tunable number of rows (e.g., 1 million rows), the select aggregation operator can check the proportion. If the proportion is below some fixed, tunable threshold value (e.g., 0.5), the select aggregation operator can perform another flush in an attempt to update the boundary value to something better. Thereafter, the select aggregation operator can reset its row count and can consume another (e.g., 1 million rows) before checking the proportion again.

Referring now to FIG. 6, method 600 represents one or more operations that a select aggregation operator is configured by a processor (e.g., query plan optimizer 130 of FIG. 1) to perform (e.g., by operation 410 of method 400 described with respect to FIG. 4) during operation (e.g., execution) of the select aggregation operator. For various example embodiments, an individual set of group keys of each aggregation operator between the select aggregation operator (that is performing method 600) and a higher-level top-k operator of the query plan includes a set of order-by keys of the top-k operator. Additionally, for various example embodiments, where the select aggregation operator (that is performing method 600) is positioned below at least one inner join operator of the query plan, the select aggregation operator is located on a probe side of the query plan.

At operation 602, the select aggregation operator (e.g., as configured by the query plan optimizer 130) monitors for top-k information from a top-k operator. At decision block 604, in response to the select aggregation operator not receiving top-k information from the top-k operator, method 600 returns to operation 602, where the select aggregation operator continues to monitor for the top-k information.

At decision block 604, in response to the select aggregation operator receiving top-k information (e.g., initial or updated top-k information) from the top-k operator, method 600 continues to operation 606, where the select aggregation operator changes (e.g., reconfigures or switches) itself to operate as a top-k aggregation operator that applies a top-k operation based on at least a portion of top-k operator information. For some example embodiments, the top-k information comprises a boundary value (e.g., an initial or updated boundary value) determined (e.g., established) by the top-k operator. Additionally, for some example embodiments, the top-k information comprises limit information from the top-k operator.

Eventually, at operation 608, the select aggregation operator receives updated top-k information (e.g., comprising updated boundary value) from the top-k operator, where the top-k aggregation operator thereafter applies the top-k operation based on the updated top-k operator information.

Figure 7:
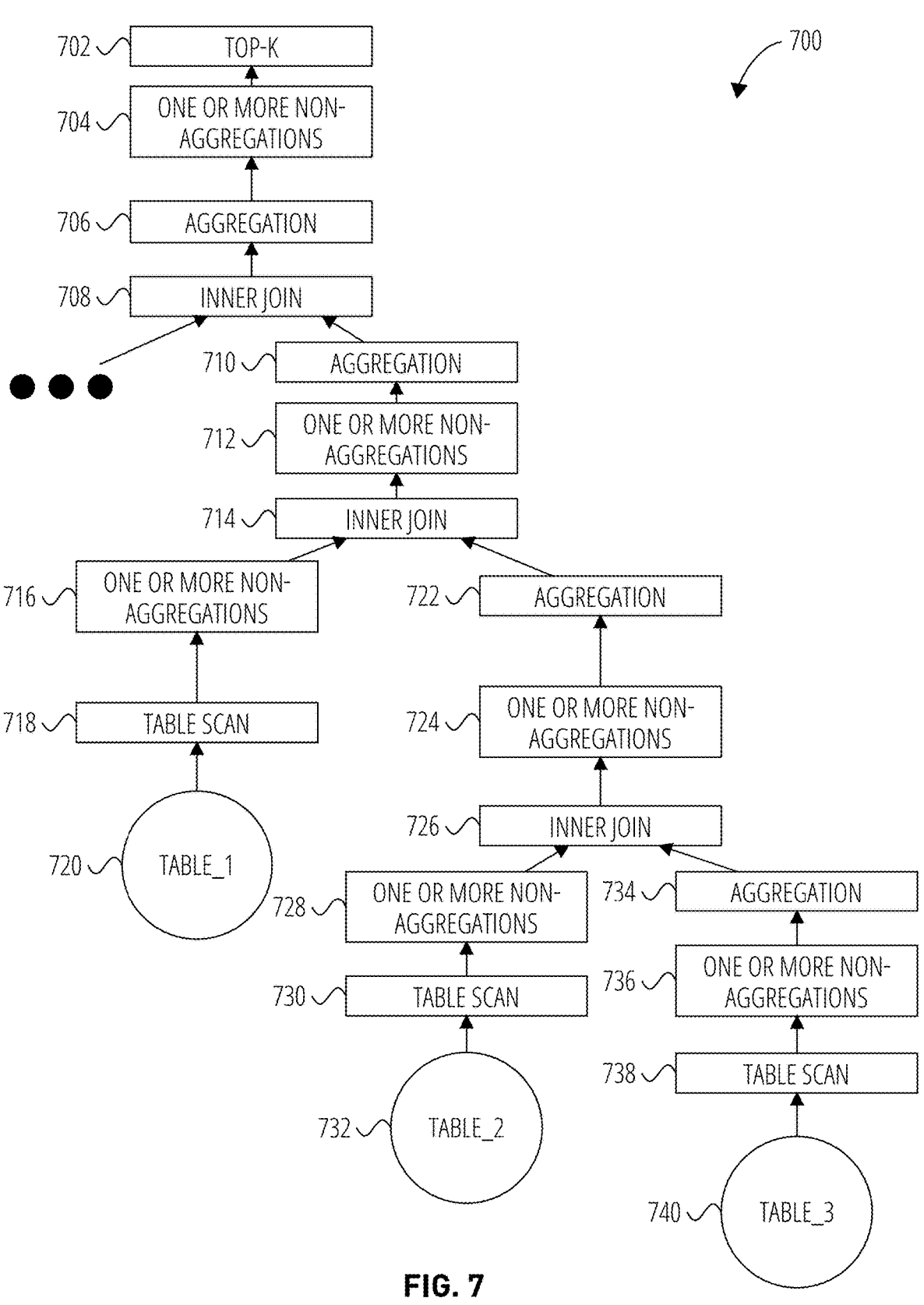
FIG. 7 is a diagram illustrating an example query plan that is optimized by using early row flush and pushing down top-k information in a query plan that includes an inner join, according to some example embodiments of the present disclosure.

FIG. 7 is a diagram illustrating an example query plan 700 that is optimized by using early row flush and pushing down top-k information in the query plan, according to some example embodiments of the present disclosure. The query plan 700 represents at least a portion of a larger query plan generated (e.g., by network-based database system 102) based on a query.

As shown, the query plan 700 comprises top-k operator 702, one or more non-aggregation operators 704, 716, 712, 724, 728, 736, inner join operators 708, 714, 726, aggregation operators 706, 710, 722, 734, table scan operator 718 (of table_1 720), table scan operator 730 (of table_2 732), and table scan operator 738 (of table_3 740).

Figure 8:
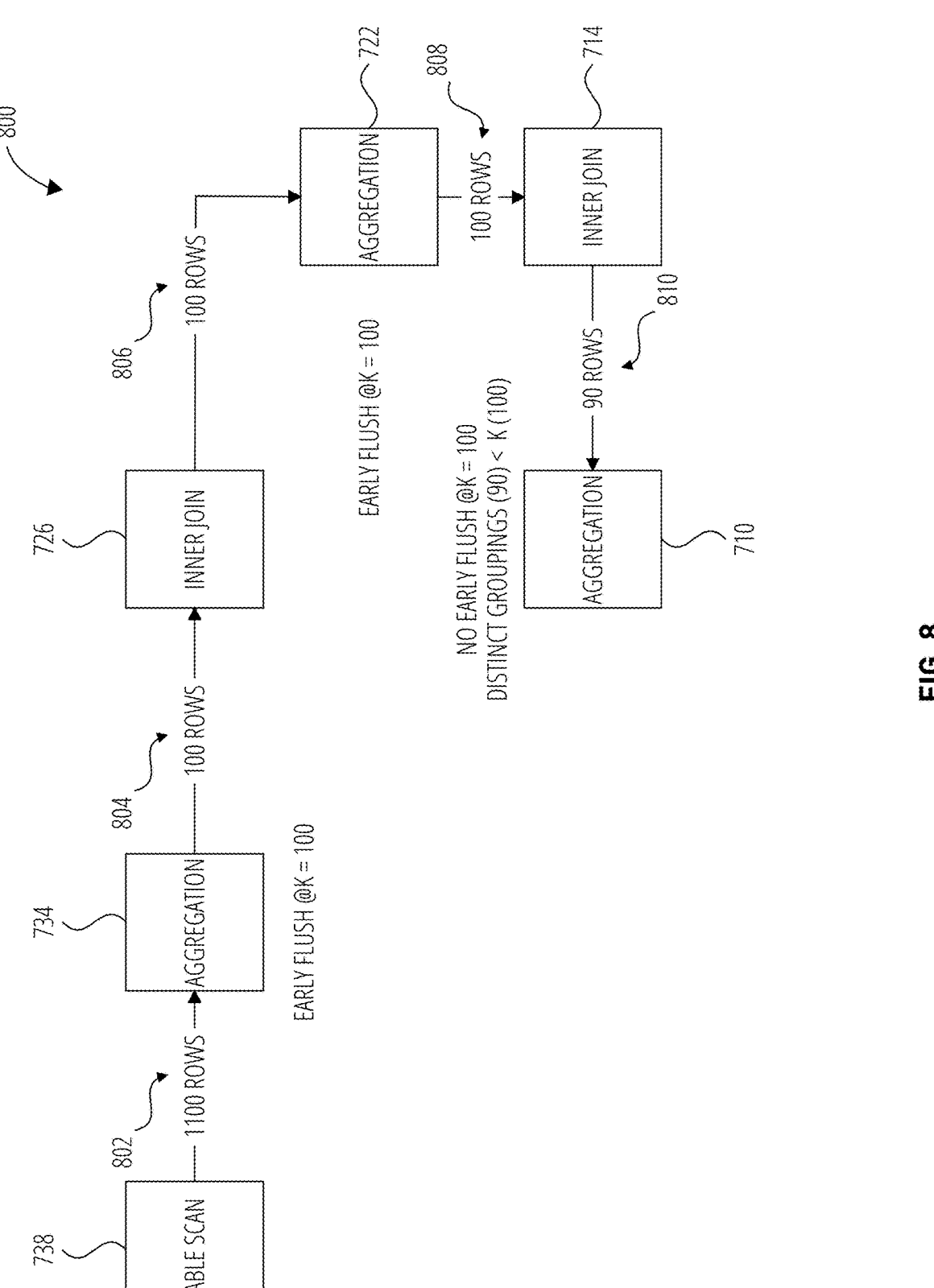
FIG. 8 through FIG. 10 are diagrams illustrating dataflow between operators of an example query plan, according to some example embodiments of the present disclosure.
Figure 9:
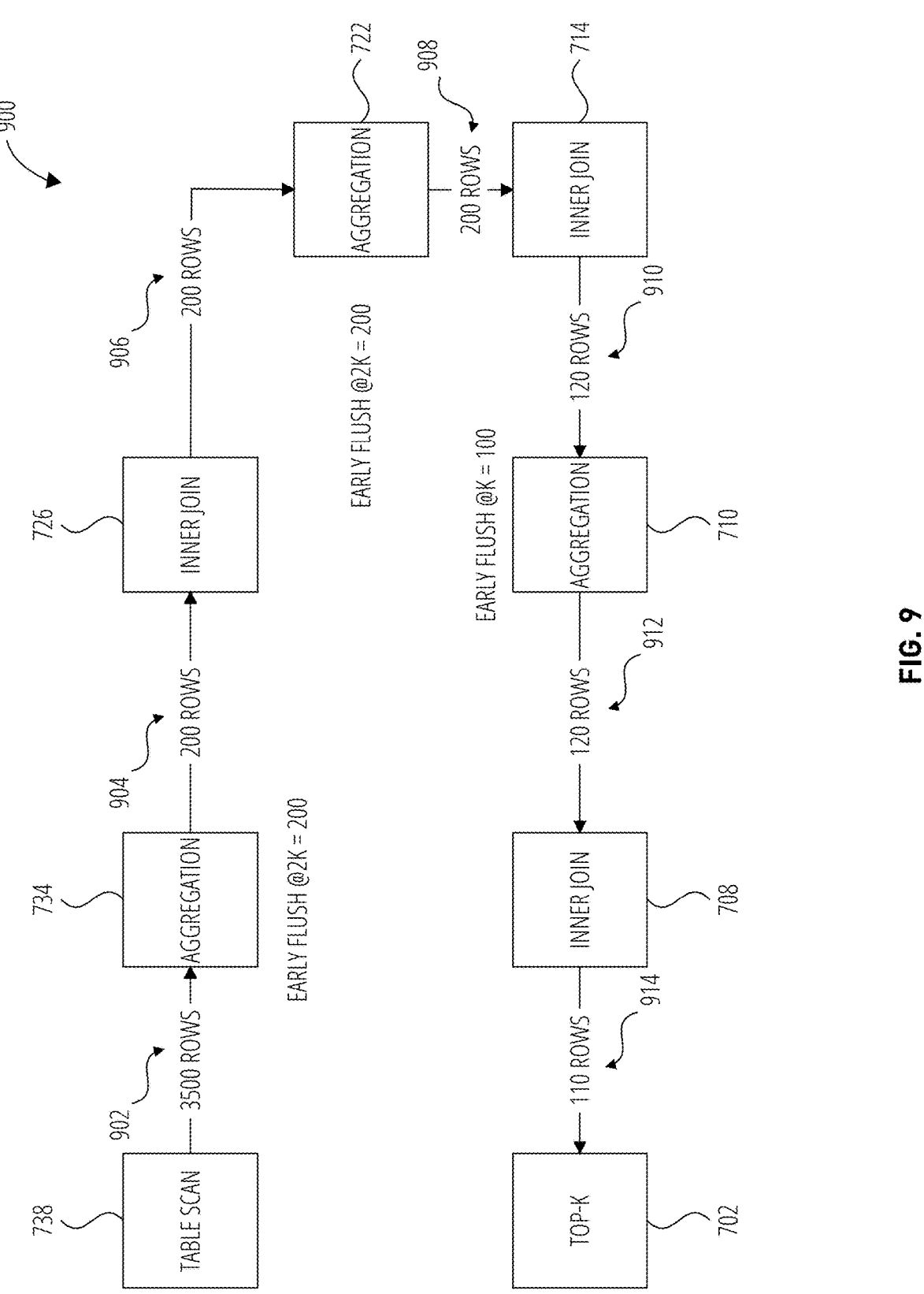
Figure 10:
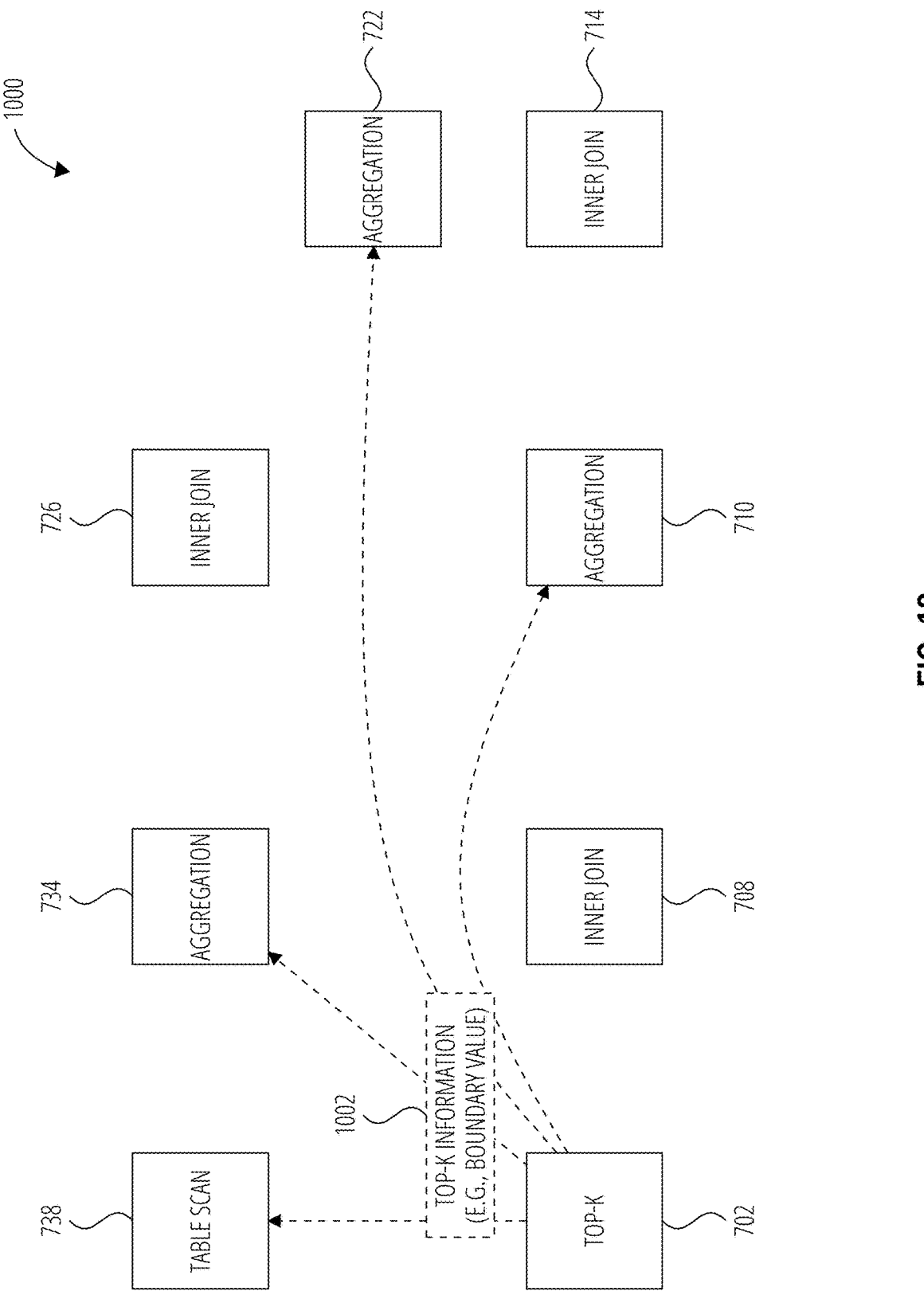

FIG. 8 through FIG. 10 are diagrams illustrating dataflow between operators of at least a portion of the example query plan 700, according to some example embodiments of the present disclosure.

Referring now to FIG. 8, flow diagram 800 illustrates initial dataflow in accordance with operations illustrated and described with respect to method 500 of FIG. 5. As shown, an initial threshold number of each of aggregation operators 706, 710, 722, 734 is set to K=100. 1100 rows are initially delivered (802) by table scan operator 738 to aggregation operator 734. As aggregation operator 734 aggregates these rows, aggregation operator 734 keeps track of how many distinct groupings it has seen thus far. After receiving 1100 rows, aggregation operator 734 determines that it now has 100 distinct groupings, which is equal to its current threshold number. This triggers the first early flush (804) of 100 rows by aggregation operator 734 to inner join operator 726. The aggregation operator 734 also resets its count of distinct groupings. These 100 rows travel to inner join operator 726, where the inner join operator 726 does not filter out any rows, thereby causing the same 100 rows to arrive (806) at aggregation operator 722.

After receiving 200 rows, aggregation operator 722 determines that it now has 100 distinct groupings, which is equal to its current threshold number. This triggers the next early flush (808) of 100 rows by aggregation operator 722 to inner join operator 714. These 100 rows travel to inner join operator 714, where the inner join operator 726 does filter out rows, thereby causing the 90 (of the 100) rows to arrive (810) at aggregation operator 710. Since the 90 rows received by the aggregation operator 710 do not meet or exceed its current threshold number (of K=100), no early flush is triggered. Execution of the query plan 700 returns to table scan operator 738.

Referring now to FIG. 9, flow diagram 900 illustrates subsequent dataflow in accordance with operations illustrated and described with respect to method 500 of FIG. 5. As shown, the threshold number of each of aggregation operators 722, 734 are adjusted (e.g., doubled to be 2×K=200) to 200 rows. Table scan operator 738 eventually delivers (902) 3500 more rows to aggregation operator 734. Again, as aggregation operator 734 aggregates these rows, aggregation operator 734 keeps track of how many distinct groupings it has seen since last resetting its count of distinct groupings. After receiving the 3500 rows, aggregation operator 734 determines that it observed 200 more distinct groupings, which is equal to its current threshold number. This triggers another early flush (904) of 200 rows by aggregation operator 734 to inner join operator 726. These 200 rows travel to inner join operator 726, where the inner join operator 726 does not filter out any rows, thereby causing the same 200 rows to arrive (906) at aggregation operator 722.

After receiving the 100 rows, aggregation operator 722 determines that it now has 200 distinct groupings, which is equal to its current threshold number. This triggers the next early flush (908) of 200 rows by aggregation operator 722 to inner join operator 714. These 200 rows travel to inner join operator 714, where the inner join operator 726 does filter out rows, thereby causing the 120 (of the 200) rows to arrive (910) at aggregation operator 710.

Upon receiving the 120 rows from the inner join operator 726, aggregation operator 710 determines that it has now observed enough distinct groupings (e.g., 120 distinct groupings tracked by the aggregation operator 710 find join partners) to trigger its first early flush (912) by the aggregation operator 710 to inner join operator 708. These 120 rows travel to inner join operator 708, where the inner join operator 708 does filter out rows, thereby causing the 110 (of the 120) rows to arrive (914) at top-k operator 702.

Referring now to FIG. 10, flow diagram 1000 illustrates subsequent dataflow in accordance with operations illustrated and described with respect to method 600 of FIG. 6. Assuming that the top-k operator 702 has received enough distinct groupings (e.g., by the 110 rows received at dataflow 914 of FIG. 9) to establish a boundary value, top-k operator 702 propagates this boundary value back to all preceding aggregation operators and table scan operators along the probe side of the query plan. According to various example embodiments, this propagation continues as long as the ordering key is present in each aggregation operator down from the top-k operator and along the probe side of the query plan. In FIG. 10, this is illustrated by top-k operator 702 sharing (e.g., pushing) top-k information 1002 to table scan operator 738, aggregation operator 734, aggregation operator 722, and top-k operator 702. Upon receiving the boundary value from the top-k operator 702, each of aggregation operator 734, aggregation operator 722, and aggregation operator 710 can now filter (e.g., prune) rows using the received boundary value. Similarly, upon receiving the boundary value, table scan operator 738 can start pruning using the received boundary value. For some example embodiments, the early flushing of method 500 of FIG. 5 can also continue. Whenever top-k operator 702 computes a new boundary value, top-k operator 702 updates the boundary in operators (e.g., nodes) as described above. In this way, various example embodiments can cause the boundary to get progressively better throughout query execution.

Figure 11:
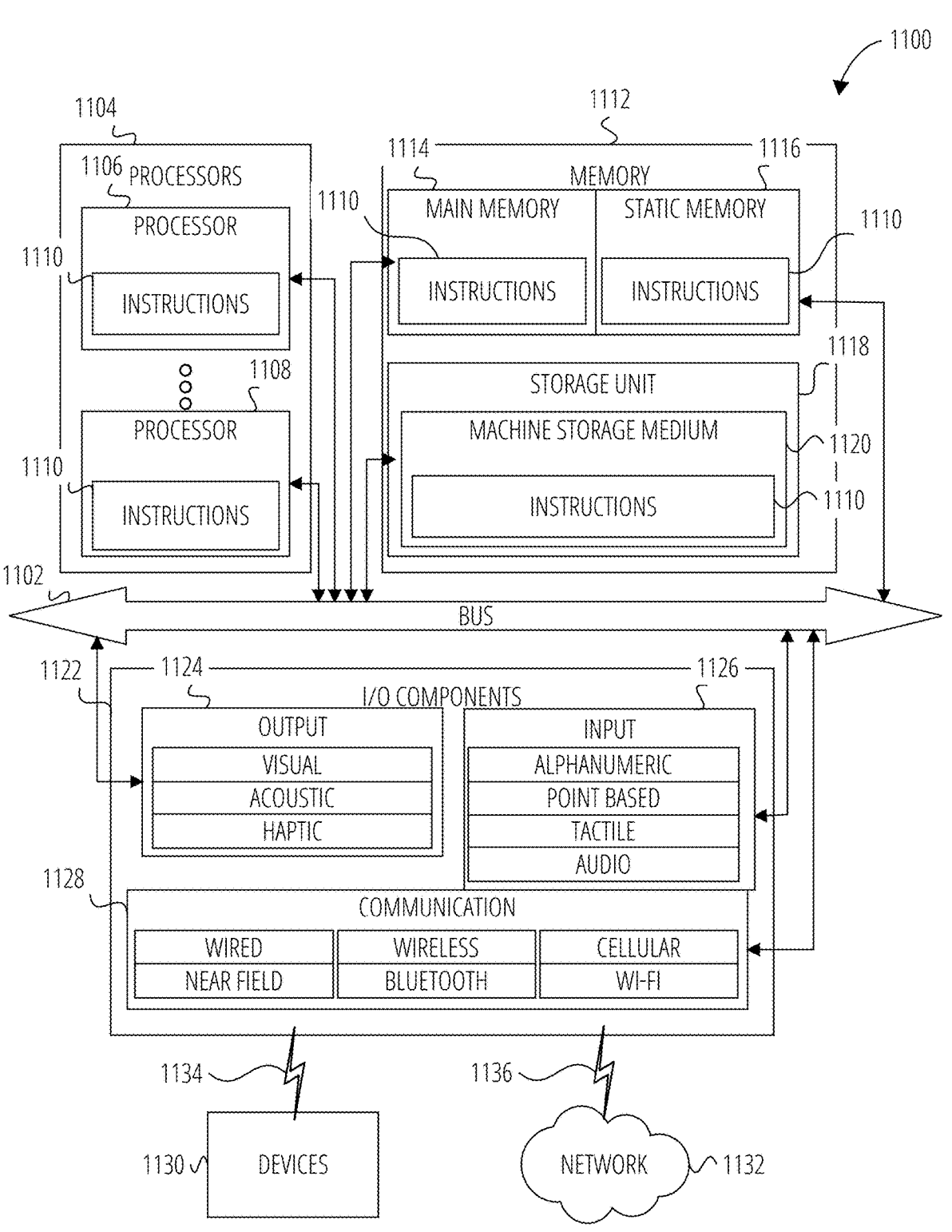
FIG. 11 illustrates a diagrammatic representation of a machine in the form of a computer system within which a set of instructions can be executed for causing the machine to perform any one or more of the methodologies discussed herein, according to some example embodiments of the present disclosure.

FIG. 11 illustrates a diagrammatic representation of a machine 1100 in the form of a computer system within which a set of instructions can be executed for causing the machine 1100 to perform any one or more of the methodologies discussed herein, according to some example embodiments of the present disclosure. Specifically, FIG. 11 shows a diagrammatic representation of the machine 1100 in the example form of a computer system, within which instructions 1110 (e.g., software, a program, an application, an applet, an app, or other executable code) for causing the machine 1100 to perform any one or more of the methodologies discussed herein can be executed. For example, the instructions 1110 may cause the machine 1100 to execute any one or more operations of any one or more of the methods described herein. As another example, the instructions 1110 may cause the machine 1100 to implement portions of the data flows described herein. In this way, the instructions 1110 transform a general, non-programmed machine into a particular machine 1100 (e.g., the compute service manager 106, the execution platform 108, client device 112) that is specially configured to carry out any one of the described and illustrated functions in the manner described herein.

In alternative embodiments, the machine 1100 operates as a standalone device or can be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a smart phone, a mobile device, a network router, a network switch, a network bridge, or any machine capable of executing the instructions 1110, sequentially or otherwise, that specify actions to be taken by the machine 1100. Further, while only a single machine 1100 is illustrated, the term "machine" shall also be taken to include a collection of machines machine 1100 that individually or jointly execute the instructions 1110 to perform any one or more of the methodologies discussed herein.

The machine 1100 includes processors 1104, memory 1112, and input/output (I/O) components 1122 configured to communicate with each other such as via a bus 1102. In an example embodiment, the processors 1104 (e.g., a central processing unit (CPU), a reduced instruction set computing (RISC) processor, a complex instruction set computing (CISC) processor, a graphics processing unit (GPU), a digital signal processor (DSP), an application-specific integrated circuit (ASIC), a radio-frequency integrated circuit (RFIC), another processor, or any suitable combination thereof) may include, for example, a processor 1106 and a processor 1108 that may execute the instructions 1110. The term "processor" is intended to include multi-core processors 1104 that may comprise two or more independent processors (sometimes referred to as "cores") that may execute instructions 1110 contemporaneously. Although FIG. 11 shows multiple processors 1104, the machine 1100 may include a single processor with a single core, a single processor with multiple cores (e.g., a multi-core processor), multiple processors with a single core, multiple processors with multiple cores, or any combination thereof.

The memory 1112 may include a main memory 1114, a static memory 1116, and a storage unit 1118, all accessible to the processors 1104 such as via the bus 1102. The main memory 1114, the static memory 1116, and the storage unit 1118 comprising a machine storage medium 1120 may store the instructions 1110 embodying any one or more of the methodologies or functions described herein. The instructions 1110 may also reside, completely or partially, within the main memory 1114, within the static memory 1116, within the storage unit 1118, within at least one of the processors 1104 (e.g., within the processor's cache memory), or any suitable combination thereof, during execution thereof by the machine 1100.

The I/O components 1122 include components to receive input, provide output, produce output, transmit information, exchange information, capture measurements, and so on. The specific I/O components 1122 that are included in a particular machine 1100 will depend on the type of machine. For example, portable machines such as mobile phones will likely include a touch input device or other such input mechanisms, while a headless server machine will likely not include such a touch input device. It will be appreciated that the I/O components 1122 may include many other components that are not shown in FIG. 11. The I/O components 1122 are grouped according to functionality merely for simplifying the following discussion and the grouping is in no way limiting. In various example embodiments, the I/O components 1122 may include output components 1124 and input components 1126. The output components 1124 may include visual components (e.g., a display such as a plasma display panel (PDP), a light emitting diode (LED) display, a liquid crystal display (LCD), a projector, or a cathode ray tube (CRT)), acoustic components (e.g., speakers), other signal generators, and so forth. The input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and/or force of touches or touch gestures, or other tactile input components), audio input components (e.g., a microphone), and the like.

Communication can be implemented using a wide variety of technologies. The I/O components 1122 may include communication components 1128 operable to couple the machine 1100 to a network 1132 via a coupling 1136 or to devices 1130 via a coupling 1134. For example, the communication components 1128 may include a network interface component or another suitable device to interface with the network 1132. In further examples, the communication components 1128 may include wired communication components, wireless communication components, cellular communication components, and other communication components to provide communication via other modalities. The devices 1130 can be another machine or any of a wide variety of peripheral devices (e.g., a peripheral device coupled via a universal serial bus (USB)). For example, as noted above, the machine 1100 may correspond to any client device, the compute service manager 106, the execution platform 108, and the devices 1130 may include any other of these systems and devices.

The various memories (e.g., 1112, 1114, 1116, and/or memory of the processor(s) 1104 and/or the storage unit 1118) may store one or more sets of instructions 1110 and data structures (e.g., software) embodying or utilized by any one or more of the methodologies or functions described herein. These instructions 1110, when executed by the processor(s) 1104, cause various operations to implement the disclosed embodiments.

As used herein, the terms "machine-storage medium," "device-storage medium," and "computer-storage medium" mean the same thing and can be used interchangeably in this disclosure. The terms refer to a single or multiple storage devices and/or media (e.g., a centralized or distributed database, and/or associated caches and servers) that store executable instructions and/or data. The terms shall accordingly be taken to include, but not be limited to, solid-state memories, and optical and magnetic media, including memory internal or external to processors. Specific examples of machine-storage media, computer-storage media, and/or device-storage media include non-volatile memory, including by way of example semiconductor memory devices, e.g., erasable programmable read-only memory (EPROM), electrically erasable programmable read-only memory (EEPROM), field-programmable gate arrays (FPGAs), and flash memory devices; magnetic disks such as internal hard disks and removable disks; magneto-optical disks; and CD-ROM and DVD-ROM disks. The terms "machine-storage medium," "computer-storage medium," and "device-storage medium" specifically exclude carrier waves, modulated data signals, and other such media, at least some of which are covered under the term "signal medium" discussed below.

In various example embodiments, one or more portions of the network 1132 can be an ad hoc network, an intranet, an extranet, a virtual private network (VPN), a local-area network (LAN), a wireless LAN (WLAN), a wide-area network (WAN), a wireless WAN (WWAN), a metropolitan-area network (MAN), the Internet, a portion of the Internet, a portion of the public switched telephone network (PSTN), a plain old telephone service (POTS) network, a cellular telephone network, a wireless network, a Wi-Fi® network, another type of network, or a combination of two or more such networks. For example, the network 1132 or a portion of the network 1132 may include a wireless or cellular network, and the coupling 1136 can be a Code Division Multiple Access (CDMA) connection, a Global System for Mobile communications (GSM) connection, or another type of cellular or wireless coupling. In this example, the coupling 1136 may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High-Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 1110 can be transmitted or received over the network 1132 using a transmission medium via a network interface device (e.g., a network interface component included in the communication components 1128) and utilizing any one of a number of well-known transfer protocols (e.g., hypertext transfer protocol (HTTP)). Similarly, the instructions 1110 can be transmitted or received using a transmission medium via the coupling 1134 (e.g., a peer-to-peer coupling) to the devices 1130. The terms "transmission medium" and "signal medium" mean the same thing and can be used interchangeably in this disclosure. The terms "transmission medium" and "signal medium" shall be taken to include any intangible medium that is capable of storing, encoding, or carrying the instructions 1110 for execution by the machine 1100, and include digital or analog communications signals or other intangible media to facilitate communication of such software. Hence, the terms "transmission medium" and "signal medium" shall be taken to include any form of modulated data signal, carrier wave, and so forth. The term "modulated data signal" means a signal that has one or more of its characteristics set or changed in such a manner as to encode information in the signal.

The terms "machine-readable medium," "computer-readable medium," and "device-readable medium" mean the same thing and may be used interchangeably in this disclosure. The terms are defined to include both machine-storage media and transmission media. Thus, the terms include both storage devices/media and carrier waves/modulated data signals.

The various operations of example methods described herein may be performed, at least partially, by one or more processors that are temporarily configured (e.g., by software) or permanently configured to perform the relevant operations. Similarly, the methods described herein may be at least partially processor-implemented. For example, at least some of the operations of the disclosed methods may be performed by one or more processors. The performance of certain operations may be distributed among the one or more processors, not only residing within a single machine but also deployed across several machines. In some example embodiments, the processor or processors may be located in a single location (e.g., within a home environment, an office environment, or a server farm), while in other example embodiments the processors may be distributed across several locations.

Described implementations of the subject matter can include one or more features, alone or in combination as illustrated below by way of examples.

Example 1 is a system comprising: at least one processor; and at least one memory storing instructions that cause the at least one processor to perform operations comprising: accessing a query plan for execution on a plurality of tables, the query plan comprising a plurality of operators, the plurality of operators comprising a top-k operator and an inner join operator positioned below the top-k operator in the query plan, the top-k operator being configured to order rows by a set of order-by keys and to limit a number of rows provided by the top-k operator to a specific number of rows, the inner join operator being configured to join rows received from at least two nodes of the query plan based on a set of join keys; determining a set of aggregation operators below the top-k operator in the query plan; modifying the query plan by configuring a select aggregation operator, in the set of aggregation operators, to perform operations comprising: tracking a count of distinct groupings observed by the select aggregation operator; determining whether to perform an early flush of distinct groupings based on the count of distinct groupings and a threshold number of groupings of the select aggregation operator; and in response to determining to perform the early flush of distinct groupings: flushing, from the select aggregation operator to a higher-level operator positioned above the select aggregation operator in the query plan, a current set of distinct groupings observed by the select aggregation operator since a last time the count of distinct groupings was initialized or reset; and resetting the count of distinct groupings; and executing the query plan.

In Example 2, the subject matter of Example 1 includes, wherein a number of distinct groupings in the current set of distinct groupings that is flushed is more than or equal to the threshold number of groupings.

In Example 3, the subject matter of Examples 1-2 includes, wherein the select aggregation operator tracks the count of distinct groupings based on a hash table maintained by the select aggregation operator.

In Example 4, the subject matter of Examples 1-3 includes, wherein the higher-level operator is the inner join operator.

In Example 5, the subject matter of Examples 1-4 includes, wherein the operations of the select aggregation operator comprise: after the resetting of the count of distinct groupings: continuing the tracking of the count of distinct groupings observed by the select aggregation operator; and receiving one or more additional rows from a lower-level operator positioned below the select aggregation operator in the query plan.

In Example 6, the subject matter of Example 5 includes, wherein the lower-level operator is a table scan operator.

In Example 7, the subject matter of Examples 5-6 includes, wherein the early flush is a first early flush, wherein the current set of distinct groupings is a first set of distinct groupings, and wherein the operations of the select aggregation operator comprise: after the receiving of the one or more additional rows: determining whether to perform a second early flush of distinct groupings based on the count of distinct groupings and the threshold number of groupings of the select aggregation operator; and in response to determining to perform the second early flush of distinct groupings: flushing, from the select aggregation operator to the higher-level operator positioned, a second current set of distinct groupings observed by the select aggregation operator since a last time the count of distinct groupings was reset; and resetting the count of distinct groupings.

In Example 8, the subject matter of Examples 1-7 includes, wherein an individual set of group keys of each aggregation operator between the select aggregation operator and the top-k operator includes the set of order-by keys of the top-k operator, and wherein the operations of the select aggregation operator comprise: receiving top-k information from the top-k operator, the top-k operator information comprising a boundary value established by the top-k operator; and in response to receiving the top-k information from the top-k operator, changing the select aggregation operator to a top-k aggregation operator that applies a top-k operation based on at least a portion of top-k operator information.

In Example 9, the subject matter of Example 8 includes, wherein the operations of the select aggregation operator comprise: receiving updated top-k information from the top-k operator, the top-k aggregation operator applying the top-k operation based on the updated top-k operator information.

In Example 10, the subject matter of Examples 1-9 includes, wherein the operations of the select aggregation operator comprise: after the flushing of the current plurality of distinct groupings: determining whether the threshold number of groupings of the select aggregation operator is to be adjusted; and in response to determining that the threshold number of groupings is to be adjusted, adjusting the threshold number of groupings.

In Example 11, the subject matter of Example 10 includes, wherein the adjusting the threshold number of groupings is based on operational performance of the top-k operator.

In Example 12, the subject matter of Examples 10-11 includes, wherein the adjusting of the threshold number of groupings comprises: increasing the threshold number of groupings.

In Example 13, the subject matter of Examples 10-12 includes, wherein the select aggregation operator determines that the threshold number of groupings is to be adjusted when a higher-level aggregation operator, positioned above the select aggregation operator in the query plan, does not receive enough distinct groupings for the higher-level aggregation operator to perform an early flush.

In Example 14, the subject matter of Examples 1-13 includes, wherein the operations comprise: receiving a query that comprises a GROUP BY clause specifying one or more group-by keys, an ORDER BY clause specifying one or more order-by keys, a LIMIT clause specifying the specific number of rows, and one or more INNER JOIN clauses each specifying an inner join of multiple tables and one or more join keys for the inner join; and based on the query, generating the query plan to execute the query.

Example 15 is a method to implement any of Examples 1-14.

Example 16 is a machine-storage medium storing instructions that when executed by a machine, cause the machine to perform operations to implement any of Examples 1-14.

Although the example embodiments of the present disclosure have been described concerning specific example embodiments, it will be evident that various modifications and changes may be made to these embodiments without departing from the broader scope of the inventive subject matter. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other example embodiments may be used and derived therefrom, such that structural and logical substitutions and changes may be made without departing from the scope of this disclosure. This Detailed Description, therefore, is not to be taken in a limiting sense, and the scope of various example embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is disclosed. Thus, although specific embodiments have been illustrated and described herein, it should be appreciated that any arrangement calculated to achieve the same purpose may be substituted for the specific embodiments shown. This disclosure is intended to cover any adaptations or variations of various example embodiments. Combinations of the above embodiments, and other example embodiments not specifically described herein, will be apparent, to those of skill in the art, upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim is still deemed to fall within the scope of that claim.

What is claimed is:

1. A system comprising:

at least one processor; and at least one memory storing instructions that cause the at least one processor to perform operations comprising:

accessing a query plan for execution on a plurality of tables, the query plan comprising a plurality of operators, the plurality of operators comprising a top-k operator and an inner join operator positioned below the top-k operator in the query plan, the top-k operator being configured to order rows by a set of order-by keys and to limit a number of rows provided by the top-k operator to a specific number of rows, the inner join operator being configured to join rows received from at least two nodes of the query plan based on a set of join keys;

determining a set of aggregation operators below the top-k operator in the query plan;

modifying the query plan by configuring a select aggregation operator, in the set of aggregation operators, to perform operations comprising:

tracking a count of distinct groupings observed by the select aggregation operator;

determining whether to perform an early flush of distinct groupings based on the count of distinct groupings and a threshold number of groupings of the select aggregation operator; and in response to determining to perform the early flush of distinct groupings:

flushing, from the select aggregation operator to a higher-level operator positioned above the select aggregation operator in the query plan, a current set of distinct groupings observed by the select aggregation operator since a last time the count of distinct groupings was initialized or reset; and resetting the count of distinct groupings; and executing the query plan.

2. The system of claim 1, wherein a number of distinct groupings in the current set of distinct groupings that is flushed is more than or equal to the threshold number of groupings.

3. The system of claim 1, wherein the select aggregation operator tracks the count of distinct groupings based on a hash table maintained by the select aggregation operator.

4. The system of claim 1, wherein the higher-level operator is the inner join operator.

5. The system of claim 1, wherein the operations of the select aggregation operator comprise:

after the resetting of the count of distinct groupings:

continuing the tracking of the count of distinct groupings observed by the select aggregation operator; and receiving one or more additional rows from a lower-level operator positioned below the select aggregation operator in the query plan.

6. The system of claim 5, wherein the lower-level operator is a table scan operator.

7. The system of claim 5, wherein the early flush is a first early flush, wherein the current set of distinct groupings is a first set of distinct groupings, and wherein the operations of the select aggregation operator comprise:

after the receiving of the one or more additional rows:
determining whether to perform a second early flush of distinct groupings based on the count of distinct groupings and the threshold number of groupings of the select aggregation operator; and
in response to determining to perform the second early flush of distinct groupings:
flushing, from the select aggregation operator to the higher-level operator positioned, a second current set of distinct groupings observed by the select aggregation operator since a last time the count of distinct groupings was reset; and
resetting the count of distinct groupings.

8. The system of claim 1, wherein an individual set of group keys of each aggregation operator between the select aggregation operator and the top-k operator includes the set of order-by keys of the top-k operator, and wherein the operations of the select aggregation operator comprise:

receiving top-k information from the top-k operator, the top-k operator information comprising a boundary value established by the top-k operator; and
in response to receiving the top-k information from the top-k operator, changing the select aggregation operator to a top-k aggregation operator that applies a top-k operation based on at least a portion of top-k operator information.

9. The system of claim 8, wherein the operations of the select aggregation operator comprise:

receiving updated top-k information from the top-k operator, the top-k aggregation operator applying the top-k operation based on the updated top-k operator information.

10. The system of claim 1, wherein the operations of the select aggregation operator comprise:

after the flushing of the current plurality of distinct groupings:
determining whether the threshold number of groupings of the select aggregation operator is to be adjusted; and
in response to determining that the threshold number of groupings is to be adjusted, adjusting the threshold number of groupings.

11. The system of claim 10, wherein the adjusting the threshold number of groupings is based on operational performance of the top-k operator.

12. The system of claim 10, wherein the adjusting of the threshold number of groupings comprises:

increasing the threshold number of groupings.

13. The system of claim 10, wherein the select aggregation operator determines that the threshold number of groupings is to be adjusted when a higher-level aggregation operator, positioned above the select aggregation operator in the query plan, does not receive enough distinct groupings for the higher-level aggregation operator to perform an early flush.

14. The system of claim 1, wherein the operations comprise:

receiving a query that comprises a GROUP BY clause specifying one or more group-by keys, an ORDER BY clause specifying one or more order-by keys, a LIMIT clause specifying the specific number of rows, and one or more INNER JOIN clauses each specifying an inner join of multiple tables and one or more join keys for the inner join; and
based on the query, generating the query plan to execute the query.

15. A method comprising:

accessing, by at least one processor, a query plan for execution on a plurality of tables, the query plan comprising a plurality of operators, the plurality of operators comprising a top-k operator and an inner join operator positioned below the top-k operator in the query plan, the top-k operator being configured to order rows by a set of order-by keys and to limit a number of rows provided by the top-k operator to a specific number of rows, the inner join operator being configured to join rows received from at least two nodes of the query plan based on a set of join keys;
determining, by the at least one processor, a set of aggregation operators below the top-k operator in the query plan;
modifying, by the at least one processor, the query plan by configuring a select aggregation operator, in the set of aggregation operators, to perform operations comprising:
tracking a count of distinct groupings observed by the select aggregation operator;
determining whether to perform an early flush of distinct groupings based on the count of distinct groupings and a threshold number of groupings of the select aggregation operator; and
in response to determining to perform the early flush of distinct groupings:
flushing, from the select aggregation operator to a higher-level operator positioned above the select aggregation operator in the query plan, a current set of distinct groupings observed by the select aggregation operator since a last time the count of distinct groupings was initialized or reset; and
resetting the count of distinct groupings; and
executing, by the at least one processor, the query plan.

16. The method of claim 15, a number of distinct groupings in the current set of distinct groupings that is flushed is more than or equal to the threshold number of groupings.

17. The method of claim 15, wherein the select aggregation operator tracks the count of distinct groupings based on a hash table maintained by the select aggregation operator.

18. The method of claim 15, wherein the higher-level operator is the inner join operator.

19. The method of claim 15, wherein the operations of the select aggregation operator comprise:

after the resetting of the count of distinct groupings:
continuing the tracking of the count of distinct groupings observed by the select aggregation operator; and
receiving one or more additional rows from a lower-level operator positioned below the select aggregation operator in the query plan.

20. A machine-storage medium storing instructions that when executed by a machine, cause the machine to perform operations comprising:

accessing a query plan for execution on a plurality of tables, the query plan comprising a plurality of operators, the plurality of operators comprising a top-k operator and an inner join operator positioned below the top-k operator in the query plan, the top-k operator being configured to order rows by a set of order-by keys and to limit a number of rows provided by the top-k operator to a specific number of rows, the inner join operator being configured to join rows received from at least two nodes of the query plan based on a set of join keys;

determining a set of aggregation operators below the top-k operator in the query plan;

modifying the query plan by configuring a select aggregation operator, in the set of aggregation operators, to perform operations comprising:

tracking a count of distinct groupings observed by the select aggregation operator;

determining whether to perform an early flush of distinct groupings based on the count of distinct groupings and a threshold number of groupings of the select aggregation operator; and in response to determining to perform the early flush of distinct groupings:

flushing, from the select aggregation operator to a higher-level operator positioned above the select aggregation operator in the query plan, a current set of distinct groupings observed by the select aggregation operator since a last time the count of distinct groupings was initialized or reset; and resetting the count of distinct groupings; and executing the query plan.

* * * * *